United States Patent
Djordjevic et al.

(10) Patent No.: US 9,609,210 B2
(45) Date of Patent: Mar. 28, 2017

(54) TECHNIQUE FOR VIEW SYNTHESIS

(71) Applicant: TELEFONAKTIEBOLAGET L M ERICSSON (PUBL), Stockholm (SE)

(72) Inventors: Branko Djordjevic, Herzogenrath (DE); Can Cagman, Aachen (DE); Alexander Langer, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 53 days.

(21) Appl. No.: 14/511,481

(22) Filed: Oct. 10, 2014

(65) Prior Publication Data

US 2015/0103197 A1 Apr. 16, 2015

(30) Foreign Application Priority Data

Oct. 11, 2013 (EP) .................................... 13004900

(51) Int. Cl.
*G06T 15/20* (2011.01)
*H04N 5/232* (2006.01)
*H04N 5/225* (2006.01)
*H04N 5/247* (2006.01)

(52) U.S. Cl.
CPC ....... *H04N 5/23238* (2013.01); *G06T 15/205* (2013.01); *H04N 5/2258* (2013.01); *H04N 5/247* (2013.01)

(58) Field of Classification Search
None
See application file for complete search history.

(56) References Cited

U.S. PATENT DOCUMENTS

| 6,198,852 B1* | 3/2001 | Anandan | G06K 9/209 345/419 |
| 2004/0086174 A1* | 5/2004 | Sun | G06K 9/03 382/154 |
| 2010/0259595 A1* | 10/2010 | Trimeche | H04N 13/0014 348/43 |

FOREIGN PATENT DOCUMENTS

| EP | 1406233 A2 | 4/2004 |
| EP | 1418545 A2 | 5/2004 |
| WO | 2010111275 A1 | 9/2010 |

OTHER PUBLICATIONS

Brown et al., "Automatic Panoramic Image Stitching using Invariant Features," International Journal of Computer Vision, 2006.*
Avidan et al., "Novel View Synthesis by Cascading Trilinear Tensors," IEEE, 1998.*
Faugeras et al., "On the geometry and algebra of the point and line correspondences between N images," Institut National de Recherche en Informatique et en Automatique, 1995.*

(Continued)

*Primary Examiner* — Kee M Tung
*Assistant Examiner* — Nicholas R Wilson
(74) *Attorney, Agent, or Firm* — Rothwell, Figg, Ernst & Manbeck, P.C.

(57) ABSTRACT

A technique for computing an image of a virtual view based on a plurality of camera views is presented. One or more cameras provide the plurality of camera views. As to a method aspect of the technique, two or three camera views that at least partially overlap and that at least partially overlap with the virtual view are selected among the plurality of camera views. The image of the virtual view is computed based on objects in the selected camera views using a multilinear relation that relates the selected camera views and the virtual view.

12 Claims, 11 Drawing Sheets

(56) References Cited

OTHER PUBLICATIONS

Avidan, et al., "Novel View Synthesis in Tensor Space", Computer Vision and Pattern Recognition, 1997 IEEE Computer Society Conference on San Juan, Puerto Rico Jun. 17-19, 1997, Los Alamitos, CA, USA, IEEE Comput. Soc, US, Jun. 17, 1997, pp. 1034-1040, XP010237480.

Cruz Mota etal., "Multiple-View Scenes: Reconstruction and Virtual Views", Jul. 10, 2008, Retrieved from the Internet: URL:http://infoscience.epfl.ch/record/125727 [retrieved on Mar. 25, 2014], 38 pages, XP055110061.

Gong et al., "Real-Time Backward Disparity-Based Rendering for Dynamic Scenes Using Programmable Graphics Hardware", Proceedings of Graphics Interface 2007 on , GI '07, 2007, p. 241-248, XP055109151.

Habed, et al. "Novel View Synthesis: a comparative analysis study", 2000, Retrieved from the Internet: URL:http://citeseerx.ist.psu.edu/viewdoc/download?doi=1 0.1.1.28.5458&rep=rep1&type=pdf [retrieved on Mar. 26, 2014], 8 pages, XP05511 0049.

Saito et al: "Appearance-Based Virtual View Generation From Multicamera Videos Captured in the 3-D Room", IEEE Transactions on Multimedia, vol. 5, No. 3, Sep. 1, 2003, pp. 303-316, XP055109708.

Extended European Search Report from EP 13004900.0, dated Apr. 8, 2014, 14 pages.

\* cited by examiner

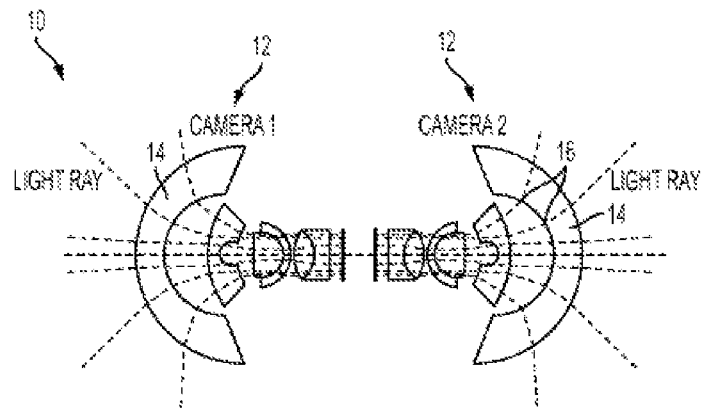
FIG. 1
Prior Art
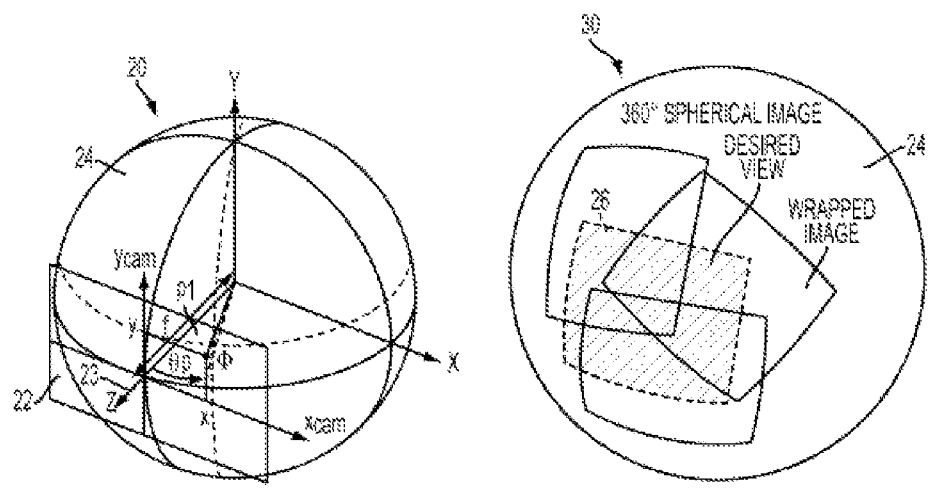
FIG. 2a
Prior Art
FIG. 2b
Prior Art

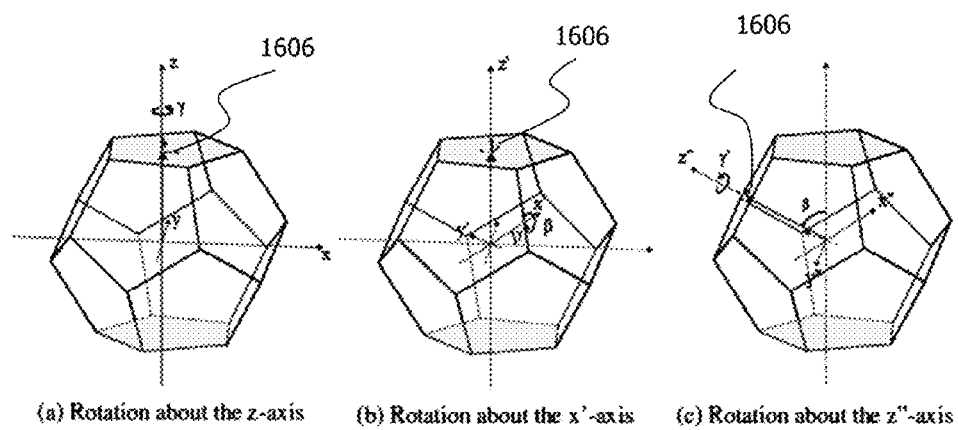
(a) Rotation about the z-axis  (b) Rotation about the x'-axis  (c) Rotation about the z''-axis
FIG. 17
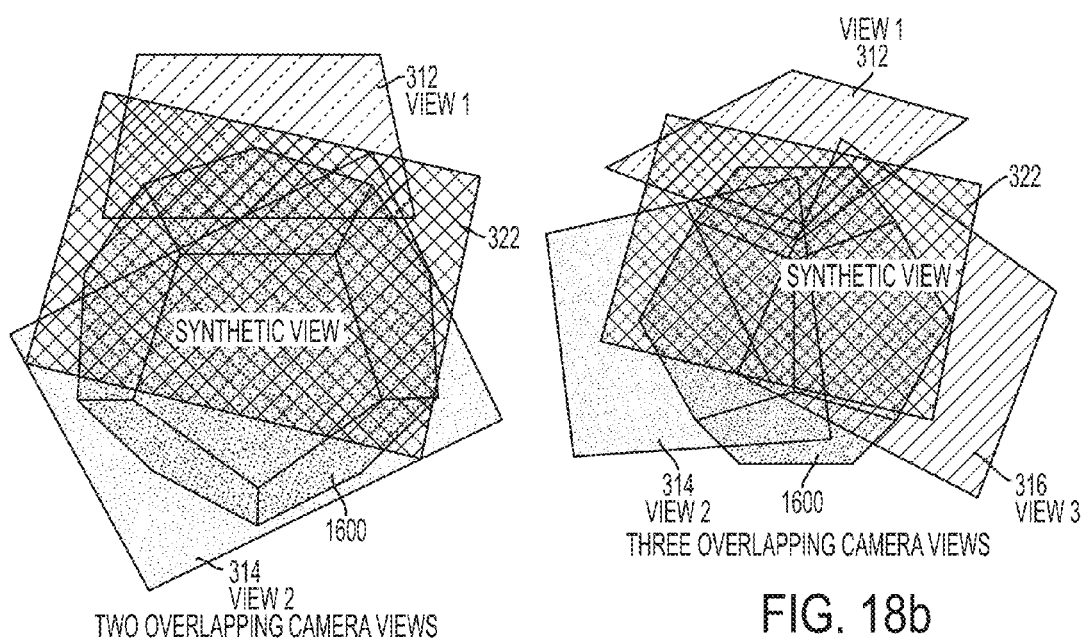
FIG. 18a TWO OVERLAPPING CAMERA VIEWS
FIG. 18b THREE OVERLAPPING CAMERA VIEWS

TECHNIQUE FOR VIEW SYNTHESIS

CROSS-REFERENCE TO RELATED APPLICATION(S)

This application claims priority to European Patent Application 13004900.0 filed on Oct. 11, 2013, which is incorporated by reference herein.

TECHNICAL FIELD

The presented disclosure generally relates to a technique for computing a virtual view based on a plurality of camera views. In particular, and without limitation, the present disclosure relates to a method and a device for computing an image of a virtual view based on at least partially overlapping camera views, wherein the virtual view is different from each of the camera views.

BACKGROUND

Vision implies a reduction of a scene, which is actually three-dimensional, to a view providing a certain perspective of the scene. The view is substantially a projection of the three-dimensional scene onto a two-dimensional surface, such as the human retina or the photosensitive surface of a chip. The view is a reduction of the full three-dimension scene to a two-dimensional image of objects in the scene. The view depends on the projection center, i.e., the point of view, and the optical axis, i.e., the direction of view.

In many applications including camera surveillance and video post-production, the image taken by a camera in hardware may not necessarily coincide with a desired view. For example, the desired view may be a function of time, may depend on the motion of an object captured by the camera, or may even be unpredictable at the time the video is recorded. Conventionally, an image is recorded for a larger field of view with sufficient resolution, so that the image can be cropped to objects of interest. However, the point of view and the direction of view are fixed at the time of recording.

Existing devices using one or few cameras for recording an omnidirectional view can be classified into three groups according to their construction. A recording device according to the first group is configured to freely change the direction of the optical axis. The camera is supported by a mechanism to enable a rotation of the camera, e.g., an aerial camera system using a gimbal assembly as the rotating mechanism. The camera is mounted onto an electromechanical drive that actuates the two degrees of rotational freedom of the gimbal. As a result, the device is able to capture images in any desired direction. There are also some approaches to rotate the camera continuously in order to record views in all directions.

However, a conceptual limitation of the first group of devices is the inability to capture images in all directions simultaneously. Furthermore, the point of view cannot be changed in post-processing.

A second group of recording devices is static and uses at least one so-called fisheye lens. The fisheye lens provides an extremely large field of view, and can be mounted to replace a linear lens or objective, or can be additionally placed as an adaptor in front a linear imaging system. Some of the fisheye lenses are able to refract the rays onto the photosensitive surface up to an angle of incidence of 90 degrees. Thus, fisheye lenses allow covering a hemispherical view with a single camera. A recording device 10 including two cameras 12 aligned at opposite directions and each equipped with a fisheye lens 14 is shown in FIG. 1. The device 10 non-linearly combines a continuum of omnidirectional views over a complete sphere.

A major disadvantage of fisheye lenses is the non-linear distortion 16 of the image in the radial direction causing a decreasing resolution towards the image periphery. As a consequence of the non-linear imaging of the fisheye lens, the resulting image is not a planar projection but blends a continuum of viewpoints. It is not possible to map each pixel in the image resulting from a fisheye lens onto a projection plane of a defined view.

The third group of devices uses catadioptric imaging, which includes a reflecting surface to enhance the field of view. An exemplary configuration includes a conical mirror and a camera that is directed towards the mirror so that the optical axis of the camera is aligned with the rotational symmetry axis of the mirror. By reflecting different views having different directions onto the camera, a larger field of view is achievable. A device for catadioptric imaging is published in "Omnidirectional Video Camera", by S. K. Nayar, Proceedings of the DARPA Image Understanding Workshop, May 1997. Another device for catadioptric imaging is published in "Multiview Radial Catadioptric Imaging for Scene Capture", by S. Kuthirummal and S. K. Nayar, ACM Trans. on Graphics, July 2006.

The disadvantages of using such convex mirrors are similar to those of the fisheye lenses. The requirement of a single viewpoint is not fulfilled by most mirror geometries and spherical aberration due to the usage of non-planar mirrors becomes noticeable as blur in the image, especially as the aperture size is increased in order to improve image brightness.

A further conventional approach takes multiple images of different portions of an essentially static or changing scene. The multiple images are stitched together, e.g., based on overlapping border regions of the images. However, stitching a plurality of images combines different views into one image leading to an optically inconsistent image. Furthermore, image stitching does not provide a view that is different from any one of the camera views. An example for a spherical arrangement of multiple cameras is the "Throwable Panoramic Ball Camera" by J. Pfeil, Technical University Berlin. The device is tossed and takes the multiple images to be stitched at the vertex of the flight trajectory in the instant of zero velocity.

A conventional way of stitching multiple images 22 having different optical axes 23 uses a non-linear transformation 20 to wrap the multiple images 22 onto one spherical surface 24, as is shown in FIG. 2a. The desired image is cropped from a corresponding portion of a spherical surface 24, as is shown in FIG. 2b. The input images 22 are wrapped onto the spherical surface according to the non-linear transformation 20, $p=(x,y)' \to p_s=(\theta,\phi)'$, wherein $$\theta = \arctan\left(\frac{x}{f}\right), \phi = \arctan\left(\frac{y}{\sqrt{x^2+f^2}}\right), f: \text{focal length}.$$

The transformed images are stitched on the spherical surface using conventional two-dimensional stitching techniques.

In a real device, however, it is not feasible that all the camera images are projected onto the same spherical surface 24. The transformation 20 takes the different optical axes 23 of the images 22 into account. But the transformation requires that all images be taken from the same point of view at the center of the sphere 24. In other words, the cameras would have to be precisely aligned so that their projection centers are at the same position. Otherwise, any slight misalignment causes a significant mismatch between the projected images, which in turn affects the cropped image.

Furthermore, the non-linear projective transformation 20 of pixel coordinates does not allow directly synthesizing the multiple images by means of a linear mapping operation. Therefore, computation-time costly image stitching algorithms have to be used, which is undesirable for real-time operation, particularly in the context of mobile devices. Conventional stitching algorithms are reviewed in Technical Report MSR-TR-2004-92, "Image Alignment and Stitching: A Tutorial", by R. Szeliski, December, 2006.

SUMMARY

Accordingly, there is a need for a technique that provides a view that is not restricted to a view used at the time of image recording.

According to one aspect, a method of computing an image of a virtual view based on a plurality of camera views is provided. One or more cameras in hardware provide the plurality of camera views. The method comprises selecting among the plurality of camera views two or three camera views that at least partially overlap and that at least partially overlap with the virtual view; and computing the image of the virtual view based on objects in the selected camera views using a multilinear relation that relates the selected camera views and the virtual view.

At least some implementations of the method may compute the image of the virtual view by means of the linear transformation specified by the multilinear relation yielding a defined viewpoint and/or a defined viewing direction for the virtual view that is not restricted to viewpoints or viewing directions of any one of the camera views.

The multilinear relation may linearly relate one object, e.g., a point or a line, in each of the selected camera views and the virtual view. The multilinear relation may be linear in a vector representing any one of the objects, e.g., a position vector representing the point in the view or a normal vector representing the line in the view. The multilinear relation may uniquely determine one point in the virtual view based on the objects in the selected camera views.

Different parts of the image of the virtual view may be computed based on different selections of two or three camera views. The different parts may form a partition, e.g., a partition of at least the image of the virtual view. For each of the parts, the partition may be indicative of the two or three at least partially overlapping camera views among the plurality of camera views. The partition may indicate either two overlapping camera views or three overlapping camera views for each of the different parts.

The virtual view may be specified by parameters of a projection. At least one of the partition and the selection may depend on the projection parameters of the virtual view. Parameters of a projection may also be specified for each of the camera views. At least some of the projection parameters of the virtual view may be defined relative to one or more of the cameras in hardware.

A mesh may be encoded in memory. The mesh may include a vertex for each of the camera views. The mesh may further include an edge for each pair of overlapping camera views among the plurality of camera views. The projection parameters of the virtual view may specify a point inside the mesh, e.g., inside a convex hull of the vertices. The mesh may indicate pairs and triples of overlapping camera views as a function of the projection parameters of the virtual view. The two or three cameras may be selected according to the indication of the mesh.

The mesh may indicate the pair of overlapping camera views corresponding to one of the edges, if the projection parameters of the virtual view correspond to the one edge. The mesh may indicate a triple of overlapping camera views, if the projection parameters of the virtual view are inside the convex hull of the vertices and do not correspond to any one of the edges of the mesh. Each triple of overlapping camera views may be associated with a two-dimensional region within the convex hull. The two-dimensional regions may be disjoint and open subsets within the convex hull. The boundary of the two-dimensional region may not be included in the two-dimensional region. The boundary of the two-dimensional regions may include the edges. An overlap between four different camera views may be represented by a three-dimensional region within the convex hull.

At least a subset of a parameter space may be partitioned in a plurality of regions. The parameter space may be defined by one or all of the projection parameters of the virtual view. A pair of two different camera views or a triple of three different camera views may be associated to each of the regions. The mesh may partition the convex hull as the subset of the parameter space. Each region may be represented in memory by limits for the viewing parameters. The limits may define the region. Each region may be defined so that the virtual view overlaps with either two or three camera views. Throughout one of the regions, the virtual view may overlap with the same two camera views or with the same three camera views.

The multilinear relation may be computed as a function of one or more of the projection parameters of the virtual view. Alternatively or in combination, the multilinear relation may be computed based on one or more projection matrices. The projection matrix may be specified for any one of the selected camera views and the virtual view. The multilinear relation may be computed as a function of the projection matrix of the virtual view, which may be parameterized by the projection parameters of the virtual view.

The projection parameters may specify at least one of a position of a projection center of the corresponding view; an orientation of an optical axis and/or a projection plane of the corresponding view; and an image distance and/or a focal length of the corresponding view. The image distance or the focal length may specify a zoom level of the view. A sequence of images of the virtual view may be computed based on changing projection parameters of the virtual view.

The multilinear relation may include a trifocal tensor, if two camera views are selected. The multilinear relation may include a quadrifocal tensor, if three camera views are selected. The trifocal tensor may be computed based on the projection matrices of the two overlapping camera views and the virtual view. The quadrifocal tensor may be computed based on the projection matrices of the three overlapping camera views and the virtual view.

Two or more views that mutually differ in at least one projection parameter may be referred to as different views. E.g., the related views may mutually differ in at least one of a relative position of the projection center and a relative orientation of the optical axis and/or the projection plane. According to a first implementation, two different views overlap, if there is a point or a pixel in each of the views that corresponds to the same point or voxel in a three-dimensional scene. There is at least one point or voxel in the three-dimensional scene that is projected onto each of the two different views.

At least in the approximation of the pinhole camera, each view (e.g., including a camera view and a virtual view) may specify a projective space, wherein the coordinate system of the projection (e.g., the projection center and the direction of projection) are external parameters of the view. The two-dimensional projective space may comprise rays in terms of a three-dimensional space. Each point or pixel of projective space may correspond to one ray in the three-dimensional space. In the sense of a space of rays, the two-dimensional projective space is embedded into the three-dimensional space. Each view may correspond to a cone in three-dimensional space.

A second implementation may determine the overlapping requirement of two different views solely based on a relative arrangement of the views. The overlapping may be determined independent of the scene or an object in the scene. Two views may overlap, if there is a first ray corresponding to a point of the first view and a second ray corresponding to a point of the second view so that the first and second rays intersect.

The overlap of three or more different views may require more than a pairwise overlap of the three different views. An overlapping portion of three-dimensional space may be projected onto each of the different views. The overlap of three or more different views may be defined and/or determined analogously to the first implementation or the second implementation. The projected overlapping portion may define an overlapping area in the corresponding view. In a first variant, the overlap does not require a lower limit for the overlap. In other words, there is no minimal requirement as to the size of the overlap. One intersection of rays including one ray for each of the overlapping views may be sufficient for the views to overlap. In a second variant, the overlapping area may be required to include at least 8 or more separate pixels in each of the overlapping views.

Each view of the views, e.g., the selected camera views and the virtual view, may specify a viewing area. In a third variant, the overlapping area may be required to cover a fraction of the viewing area, e.g., at least 20% or 50% of the viewing area. The viewing area may limit the projective space of the view, e.g., to a set of rays representative of points in the viewing area. The set of rays may be referred to as the cone of the view.

One or more of the projection parameters of the virtual view, e.g., the translation, the rotation and/or the zoom level, may be derived from at least one of a time-integration of signals of an accelerometer, a time-integration of signals of a gyro sensor and shift vectors extracted from the camera views.

A plurality of cameras in hardware may provide the camera views. A relative arrangement of the cameras may have fixed or elastically coupled relative distances and/or fixed or elastically coupled relative orientations. The method may further comprising calibrating the arrangement of the cameras by computing and storing at least one of a projection matrix for each of the cameras, a fundament matrix for each pair of neighboring cameras having overlapping camera views, and a trifocal tensor stored for each triple of neighboring cameras having overlapping camera views.

Computing the image of the virtual view may include deriving a pixel for the virtual view based on a point or a line in each of the two selected camera views using the trifocal tensor as the multilinear relation. Computing the image of the virtual view may include deriving a pixel for the virtual view based on a point or a line in each of the three selected camera views using the computed quadrifocal tensor.

According to a further aspect, a computer program product is provided. The computer program product comprises program code portions for performing any one of the steps disclosed for the method aspect when executed on one or more computing devices. The computer program product may be stored on a computer readable recording medium or may be provided in a data network for download to such a medium.

As to a hardware aspect, a device for computing an image of a virtual view based on a plurality of camera views is provided. One or more cameras in hardware provide the plurality of camera views. The device comprises a selecting unit adapted to select among the plurality of camera views two or three camera views that at least partially overlap and that at least partially overlap with the virtual view; and a computing unit adapted to compute the image of the virtual view based on objects in the selected camera views using a multilinear relation that relates the selected camera views and the virtual view.

The device may further comprise a receiver adapted to wirelessly receive image data from the one or more cameras in hardware. A geometric center defined by the projection centers of the cameras in hardware may at least approximately coincide with a center of mass of the device.

Any one of the units, or a dedicated unit of the device, may further be adapted to perform any one of the steps disclosed for the method aspect.

BRIEF DESCRIPTION OF THE DRAWINGS

In the following, the disclosure is further described with reference to exemplary embodiments illustrated in the drawings, wherein:

FIG. 1 is a cross-section of a conventional recording device using a pair of fisheye lenses;

FIGS. 2a and 2b schematically illustrate a convention method for stitching images;

FIG. 17 illustrates a computation of positions and orientations for the spherically symmetric camera arrangement of FIG. 16;

FIGS. 18a and 18b show examples of two and three overlapping camera views selected for computing a virtual view using the camera arrangement of FIG. 16;

DETAILED DESCRIPTION

Figure 3:
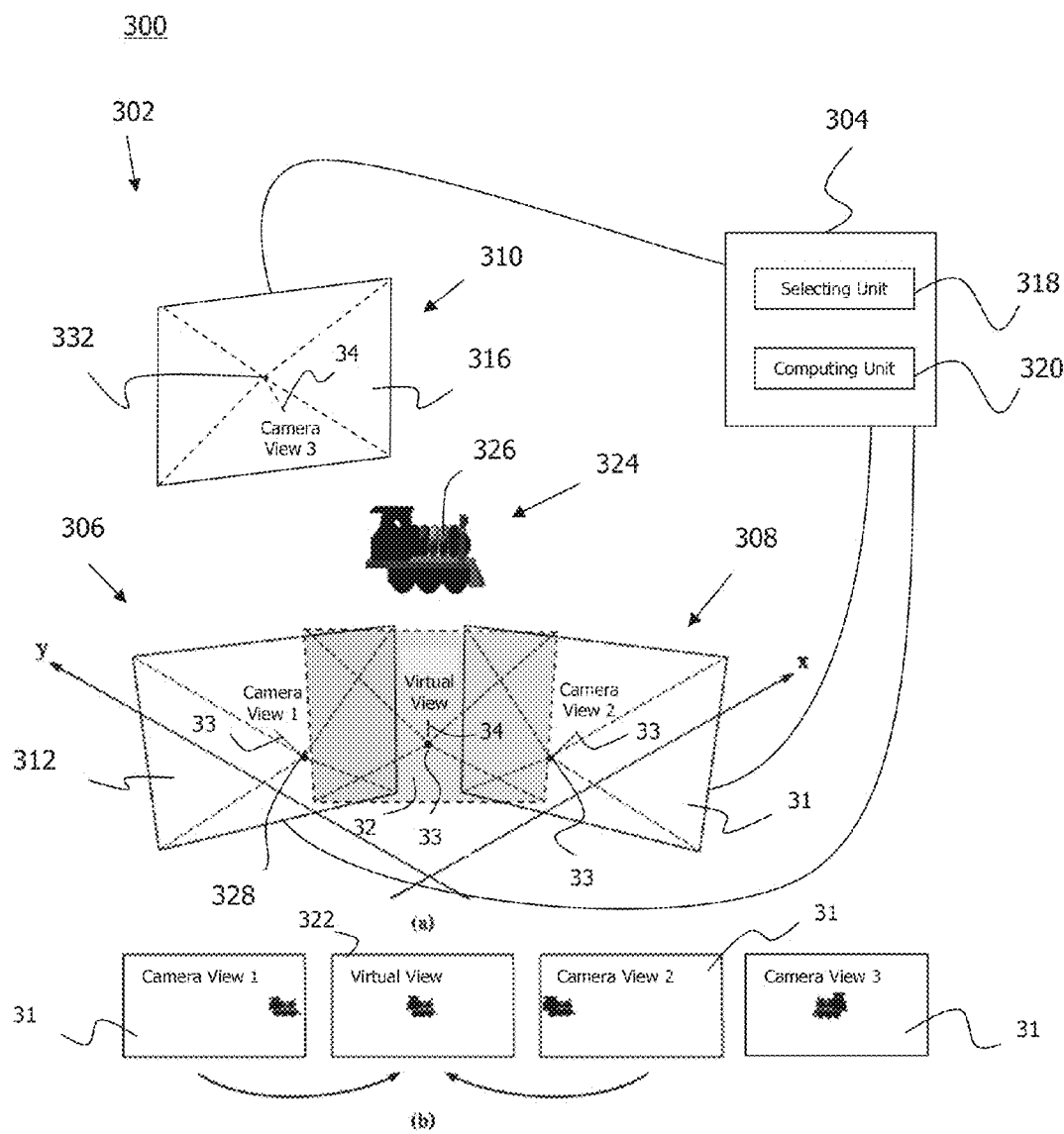
FIG. 3 is a schematic block diagram illustrating a system environment for implementing an embodiment of a device for computing an image of a virtual view.

In the following, for purposes of explanation and not limitation, specific details are set forth, such as particular sequences of steps and spatial configurations, in order to provide a thorough understanding of the disclosure. It will be apparent to one skilled in the art that the invention may be practiced in other embodiments that depart from these specific details. For example, while the embodiments will be described for a device specific for recording and/or processing images, the invention may also be implemented in user equipment for mobile communication providing a range of other functionalities. Furthermore, the invention may be implemented in a distributed many, e.g., by a plurality of recording devices in wired or wireless communication. Moreover, the invention may also be stationarily implemented, e.g., in a television studio or film studio.

Moreover, those skilled in the art will appreciate that functions and components explained herein below may be implemented using software functioning in conjunction with a programmed microprocessor or with a general purpose computer. It will also be appreciated that while the embodiments are primarily described in the form of methods and devices, the invention may also be embodied in a computer program product as well as in a system comprising a processor and a memory coupled to the processor, wherein the memory is encoded with one or more programs that perform the functions or implement the components disclosed therein.

FIG. 3a schematically illustrates a system 300 including a camera arrangement 302 and a device 304 for computing an image of a virtual view based on a plurality of camera views. The camera arrangement 302 includes a plurality of cameras 306, 308 and 310 in hardware. Each of the cameras 306 to 310 is configured to provide the camera view denoted by 312, 314, and 316, respectively. The device 304 is wired or wirelessly coupled to each of the plurality of cameras 306 to 310. Alternatively, one or few moving cameras provide the plurality of camera views 312 to 316, e.g., from different points of view and/or along different optical axes.

The device 304 includes a selecting unit 318 and a computing unit 320. The selecting unit 318 is configured to select, among the plurality of camera views 312 to 316, two or three camera views that at least partly overlap with a virtual view 322. Each of the camera views 312, 314, 316 and 322 is representable by an image, i.e., an array of pixels. The images of the selected two or three camera views, e.g., the camera views 312 and 314, are transmitted via the coupling to the device 304.

The computing unit 320 is configured to compute the image of the virtual view 322 based on objects included in each of the selected camera views using a multilinear relation that relates the selected camera views and the virtual camera view 322. Such objects include at least one of a pixel and a line corresponding to a physical object 326 in a scene 324.

A view is, at least approximately, a projection of the three-dimensional scene 324. In the schematic illustration of FIG. 3, each of the views 312, 314, 316 and 322 is represented by a central projection towards a corresponding projection center 328, 330, 332 and 334 onto a projection plane that is perpendicular to a corresponding optical axis 336, 338, 340 and 342, respectively.

Figure 4:
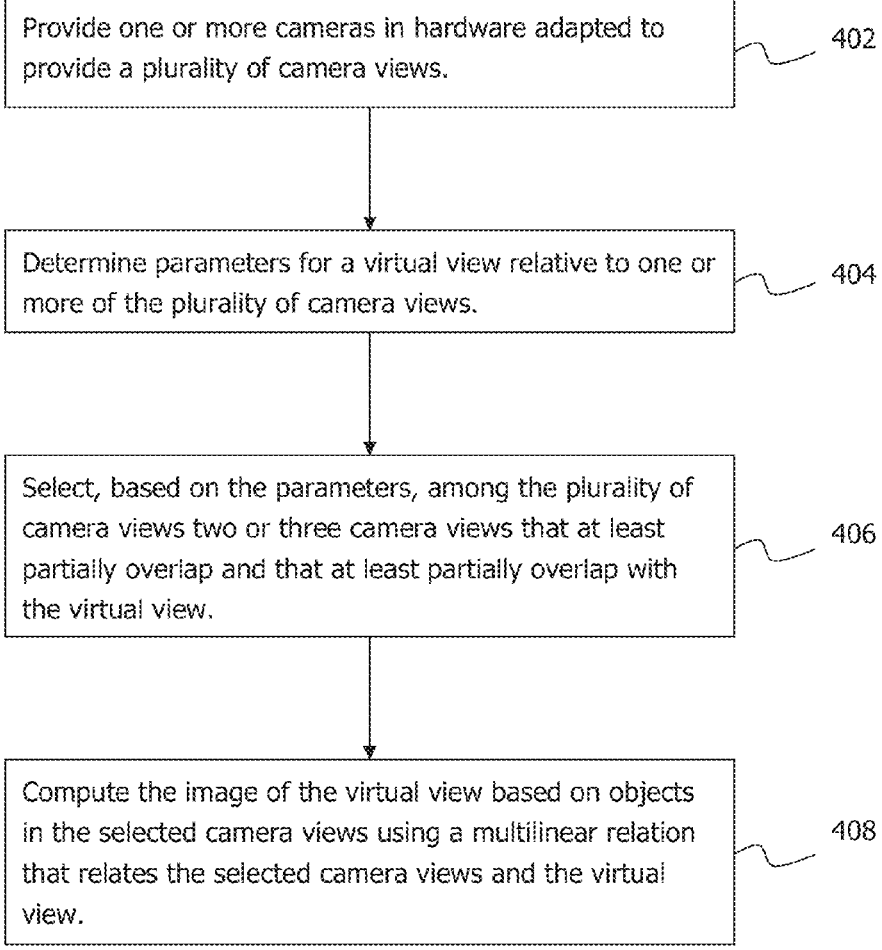
FIG. 4 is a flowchart illustrating a method embodiment of a method for computing an image of a virtual view.

FIG. 4 shows a flowchart for an embodiment of a method 400 of computing an image of a virtual view based on a plurality of camera views. One or more cameras in hardware, e.g., the cameras 306 to 310, provide a plurality of camera views in a step 402. Parameters for a virtual view relative to the plurality of camera views are determined in a step 404. The parameters include the projection center 334 of the virtual view 322 and the optical axis 342 of the virtual view 322. The parameters are determined relative to the camera views, e.g., relative to one or more of the camera views 312 to 316. For example, the projection center 334 of the virtual view 322 is determined relative to the projection center 328 of the camera view 312. The optical axis 342 of the virtual view 322 is determined relative to the optical axis 336 of the camera view 312.

In a step 406 of the method 400, two or three camera views among the plurality of camera views are selected so that the selected camera views and the virtual view at least partially overlap. Overlapping views among the plurality of views 312, 314, 316 and 322 have at least one object in common. One object included in each of the overlapping views 312 and 314 is a surface element 326 of an opaque body in the scene 324, as is illustrated in FIG. 3. While the camera view 316 is directed towards the same scene 324 including the opaque body therein, the camera view 316 shows the scene 324 from a back side. Due to the opaqueness of the body, the back side camera view 316 does not include the surface element 326, which is included in each of the front side camera views 312 and 314. Consequently, the camera views 312 and 314 are selected in the step 406 of the method 400, as is illustrated in FIG. 3b.

In a step 408 of the method 400, the image of the virtual view 322 is computed based on two-dimensional coordinates of the common objects 326 in the selected camera views 312 and 314 using a multilinear relation that linearly relates the selected overlapping camera views 312 and 314 and the virtual view 322.

Figure 5:
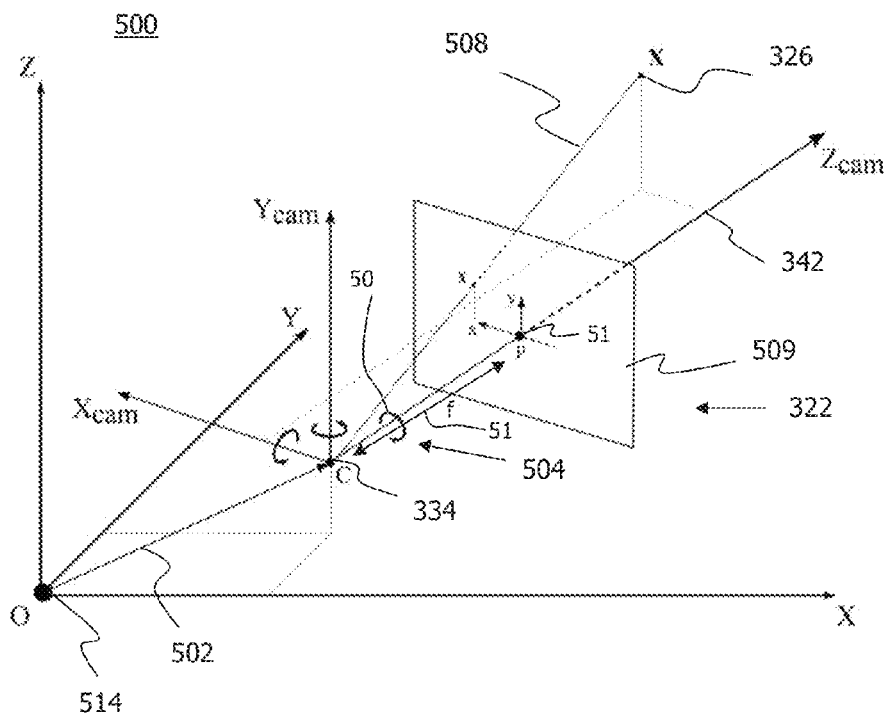
FIG. 5 is a diagram schematically illustrating parameters of a projection for a camera view or a virtual view.

FIG. 5 schematically illustrates parameters of a view, which specify a projection 500. While FIG. 5 relates to the virtual view 322, the description of viewing parameters also applies to each of the camera views 312 to 316.

The virtual view 322 is a two-dimensional image as a function of objects 326 in three-dimensional space. The function depends on parameters, such as the projection center 334 and the orientation of the optical axis 342 in space. The projection center 334 is changed by a translation 502. The orientation is changed by a rotation 504, e.g., a rotation of a camera in the case of the camera views and the appearance of a rotation in the case of the virtual view. The rotation 504 can be determined by a change of the optical axis 342 of the virtual view 322 and a rotation 506 about the optical axis 342.

At least approximately, the relation between a point X of the three-dimensional object 326 and a point x in the virtual view 322 is the projection 500 along a ray 508 towards the projection center 334 onto a projection plane 509. The projection plane 509 is orthogonal to the optical axis 342. The point of interception between the optical axis 342 and the projection plane 509 is referred to as a principal point 510.

Using the three-dimensional coordinate system ($X_{cam}$, $Y_{cam}$, $Z_{cam}$), which origin is the projection center 334 and which orientation of the Z-axis corresponds to the optical axis 342, the projection corresponds to the mapping:

$$(X, Y, Z)^T \mapsto \left(f\frac{X}{Z}, f\frac{Y}{Z}\right)^T. \quad \text{(Eq. 1)}$$

A distance 512 denoted by f between the projection center 334 and the principal point 510 is an internal parameter of the view 322. In terms of an optical system used for implementing the projection 500 schematically illustrated in FIG. 5 for one of the plurality of camera views, the internal parameter 512 corresponds to an image distance. The distance 512 may also be referred to as a focal length, f. The internal parameter f defines a zoom level for the virtual view 322. The projection plane 509 may be realized by a photosensitive surface of a chip, e.g. a CCD chip or CMOS chip.

Using homogeneous coordinates for the point x in the virtual view 322, $$x = \begin{pmatrix} f\frac{X}{Z} \\ f\frac{Y}{Z} \\ 1 \end{pmatrix} \triangleq \begin{pmatrix} fX \\ fY \\ Z \end{pmatrix}, \quad \text{(Eq. 2)}$$

the equivalence according to the scaling invariance of the homogenous coordinates (denoted by the symbol $\triangleq$) allows computing the projection by means of matrix multiplication:

$$\begin{pmatrix} X \\ Y \\ Z \\ 1 \end{pmatrix} \mapsto \begin{pmatrix} fX \\ fY \\ Z \end{pmatrix} = \begin{bmatrix} f & & & 0 \\ & f & & 0 \\ & & 1 & 0 \end{bmatrix} \begin{pmatrix} X \\ Y \\ Z \\ 1 \end{pmatrix}, \quad \text{(Eq. 3)}$$

wherein $$x = \begin{pmatrix} X \\ Y \\ Z \\ 1 \end{pmatrix} \quad \text{(Eq. 4)}$$

represents the object 326 in three-dimensional space by means of homogeneous coordinates X, so that under the scaling equivalence, $X \triangleq rX$, $r>0$, the homogeneous coordinates X further represent the ray 508.

Using homogeneous coordinates for an arbitrary real-world coordinate system, e.g., a coordinate system defined relative to the scene 324, which origin O shown at reference sign 514 is translated by the translation vector 502, and which orientation is rotated by the rotation angles 504 relative to the camera coordinate system, the mapping of the realworld coordinate X to the point x of the view is computed according to $$x = PX. \quad \text{(Eq. 5)}$$

The projection according to Eq. (5) is parameterized. The projection matrix, P, includes both the internal parameters of the view, $$K = \begin{bmatrix} \alpha_x & s & x_0 \\ & \alpha_y & y_0 \\ & & 1 \end{bmatrix}, \quad \text{(Eq. 6)}$$

and the external parameters for translation, t, and rotation, R:

$$P = K[R|t]. \quad \text{(Eq. 7)}$$

The vertical line on the left-hand side of Eq. 7 denotes a line between the third and fourth columns of the matrix in square brackets.

The internal parameters, $\alpha_x$ and $\alpha_y$, on the diagonal of K in Eq. 6 represent the number of pixels per unit distance along x- and y-axes in the projection plane 509 of the virtual view 322, which implies the image distance f. The internal parameters K further include parameters $x_0$ and $y_0$ defining the principal point 510. A skew parameter, s, is equal to zero, if pixels of an image sensor are aligned with the x- and y-axes of the projection plane 509.

Optionally, the computing unit 320 evaluates $a_x = f/m_x$ and $a_y = f/m_y$, wherein f specifies the focal length, $m_x$ denotes a horizontal distance between neighboring pixels, and $m_y$ denotes a vertical distance between neighboring pixels. The values $a_x$ and $a_y$ represent a focal length in terms of pixel units.

The internal parameters K are preset for each of the plurality of cameras in hardware by means of a known camera calibration technique. An exemplary camera calibration technique is published in "A Flexible New Technique for Camera Calibration" by Z. Zhang, IEEE Transactions on Pattern Analysis and Machine Intelligence, 22 (11), pages 1330 to 1334, 2000.

From a numerical point of view, the projection matrix P has the dimension dim P=3×4 including 12 elements that are subject to one constrained, namely scale invariance, $P \triangleq \lambda \cdot P$, $\lambda > 0$. Consequently, a total number of parameters for each of the plurality of views, including the camera views 312 to 316 and the virtual view 322, is 12−1=11.

The 11 viewing parameters include 5 internal parameters and 6 external parameters. The 5 internal parameters can be represented by skew s of the image sensor, the image distance f, a relative scale $\alpha_x/\alpha_y$ of the axes of the image sensor, and the x- and y-coordinates of the principal point 510. The external parameters include three degrees of freedom for the translation 502 in space and three degrees of freedom for the rotation 504 in space. The projection matrix P has regularly full rank, i.e., rank P=3. The physical meaning of the projection matrix is to associate an element of three-dimensional projective space, e.g., the ray 508, with an element of two-dimensional projective space, e.g., the point x in the view 322.

Figures 6A, 6B:
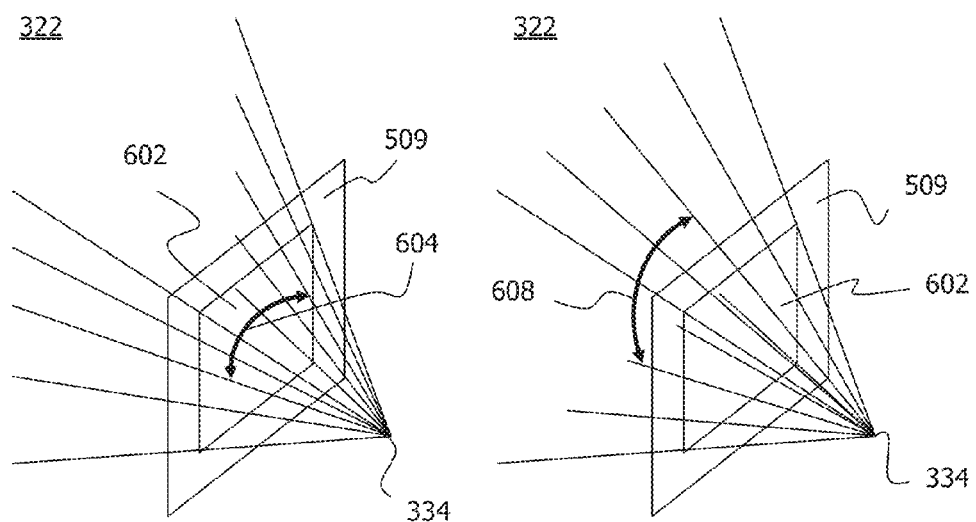
FIGS. 6a and 6b schematically illustrate a viewing area for a camera view or a virtual view.

FIGS. 6a and 6b schematically illustrate restrictions on the view 322 in a horizontal direction and a vertical direction, respectively. The restriction to a viewing area 602 is a further optional internal parameter. While FIGS. 6a and 6b relate to the virtual view 322, the description of the restricted viewing area 602 also applies to each of the camera views 312 to 316.

The restriction can be described by a horizontal opening angle 604 and/or a vertical opening angle 608. Alternatively, for some or all of the views, including the camera views 312 to 316 and the virtual view 322, the viewing area 602 has a more complex shape than the rectangular viewing area 602 shown in FIGS. 6a and 6b. When an object 326 is "included" in the view 322, this means that the corresponding ray 508, which is defined by the projection center 334 and the point X of the object 326 in space, intersects the viewing area 602. While the description of the viewing are 602 refers to the virtual view 322 shown in FIGS. 6*a* and 6*b*, a corresponding definition of the viewing area 602 applies for each of the camera views.

Figure 7:
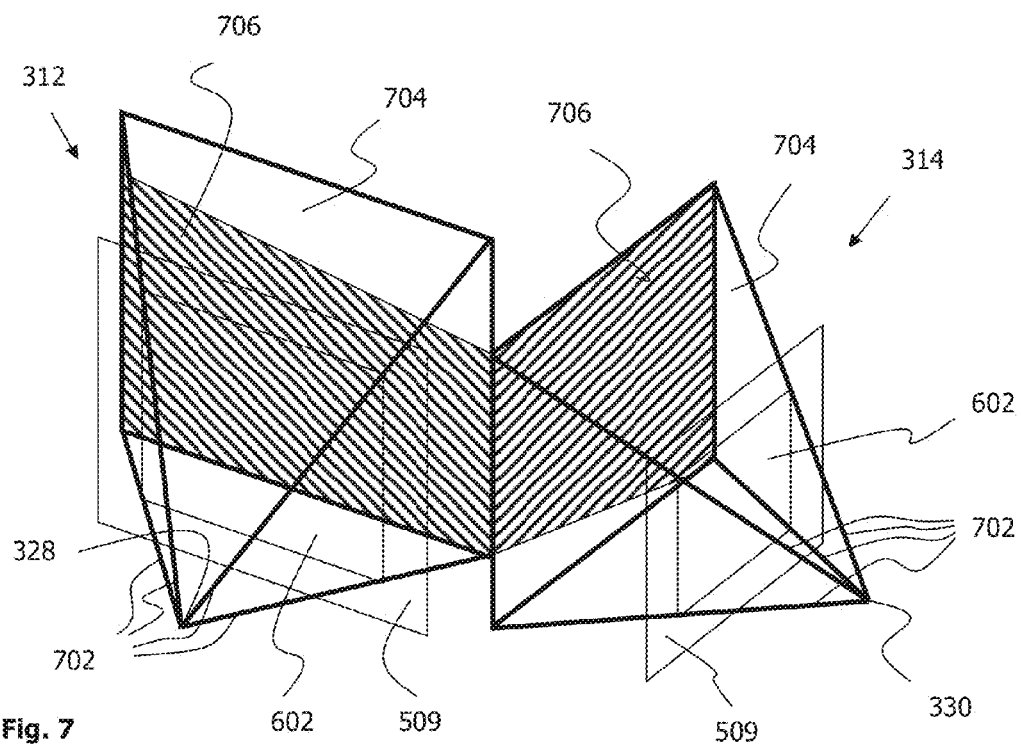
FIG. 7 schematically illustrates overlapping views.
Figure 8:
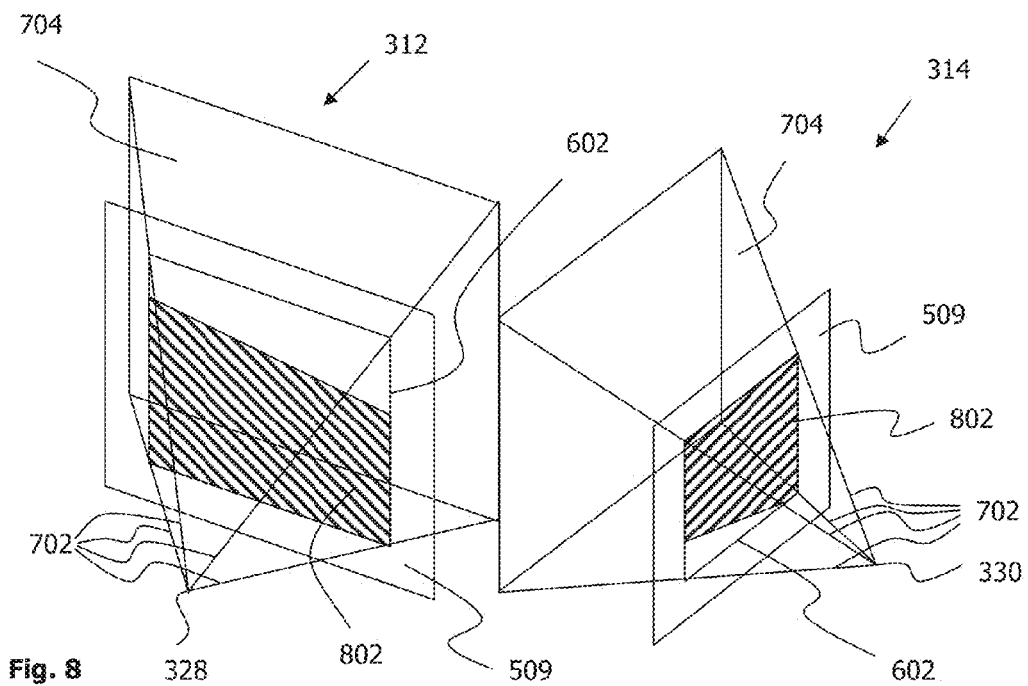
FIG. 8 schematically illustrates an overlapping area.

Alternatively or in addition to the definition of overlapping views based on at least one object 326 included in each of the overlapping views, as described with reference to FIG. 3, a criterion for overlapping views that is independent of objects 326 in the scene 324 is described with reference to FIGS. 7 and 8. While the criterion is exemplarily described for the overlapping views 312 and 314, the criterion is not limited to camera views. The criterion is also applicable to an overlap including any number of camera and virtual views. In particular, the criterion is applicable for determining, if two camera views and one virtual view overlap, as well as, if three camera views and one virtual view overlap.

Rays 702 representative of corners of the viewing area 602 in the projection plane 509 of each of the views 312 and 314 illustrate a viewing cone 704 for each of the overlapping views 312 and 314. For a general shape of the viewing area 602, the viewing area 602 defines a base of the corresponding cone 704 generated by scaling the base relative to the projection center. Given the viewing cone 704, the viewing area 602 is an intersection between cone 704 and projection plane 509. For a given view, the corresponding cone 704 includes all rays 508 (each of which is representable by scaling a homogeneous coordinate $X_{cam}$) having a corresponding point (which is representable by the homogeneous coordinate x) in the view.

The cones 704 of the overlapping views 312 and 314 intersect in space. A hatched area schematically illustrates a cross-section 706 parallel to the projection plane 509 through the intersection of the cones 704.

Projecting the intersection of the cones 704 onto the projection plane 509, according to the corresponding one of the views 312 and 314, results in an overlapping area 802. The overlapping area 802 is a subset of the viewing area 602. Since all points of the intersection of the cones 704 along a ray towards the projection center 328 correspond to the same point in the overlapping area 802, the overlapping area 802 is efficiently determined by projecting the points in the cross-section 706. The overlapping area for the view 312 can also be determined by projecting any other cross-section, which is not parallel to the optical axis 336 of the view 312, of the intersection of the cones 704.

In the case of three different views, the overlapping area 802 is determined analogously to the determination described with reference to FIG. 8 for the case of the two different views 312 and 314. If there is an intersection of all three different cones 704 corresponding to the three different views, the three different views overlap. The overlapping area 802 is computed based on the intersection, or a cross-section thereof, by projecting the intersection or the cross-section onto the projection plane 509.

While above description for determining overlapping areas 802 for two or more different views is described for an overlapping area 802 as a subset of the viewing area 602 determined for one or each of the overlapping views, the overlapping area 802 can also be determined for a view that is not one of the views defining the cones 704 for the intersection. For example, two or three different camera views among the plurality of camera views define the intersecting cones 704. The intersection, or a cross-section thereof that is not parallel to the optical axis of the virtual view 322, is projected according to the virtual view 322 for determining the overlapping area 802 of the two or three overlapping camera views in the virtual view 322.

Figure 9:
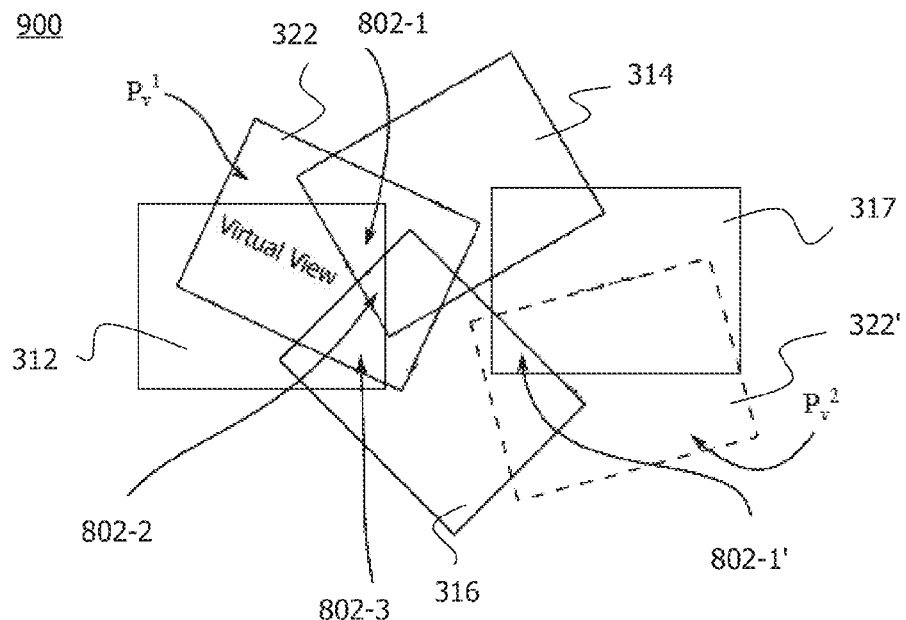
FIG. 9 schematically illustrates a partition of a virtual view depending on overlapping areas.

The method 400 of computing an image of the virtual view 322 is further described for an exemplary configuration 900 of camera views provided according to the step 402, as is schematically illustrated in FIG. 9. The parameters, e.g., some or all of the parameters described with reference to FIG. 5, are determined for the virtual view 322 according to the step 404.

The viewing area 602 of the virtual camera view 322 is partitioned into a plurality of overlapping areas 802-1, 802-2, . . . . For the clarity of the illustration, only three overlapping areas 802-1 to 802-3 are shown in FIG. 9. The overlapping area 802-1 corresponds to the overlapping camera views 312 and 314. The overlapping area 802-2 corresponds to the overlapping camera views 312, 314 and 316. The overlapping area 802-3 corresponds to the overlapping camera views 312 and 316.

For partitioning the viewing area 602 of the virtual view 322, all overlapping areas based on three camera views, e.g., the overlapping area 802-2, are associated to a selection of the corresponding three overlapping camera views. All portions of the overlapping areas based on two overlapping camera views, e.g., the overlapping areas 802-1 and 802-3, are assigned to a selection of the corresponding two overlapping camera views to the extent that the portions do not overlap with an overlapping area based on three camera views, e.g., the overlapping area 802-3. In other words, the overlapping areas 802-1 and 802-3 based on two camera views are reduced by excluding a portion that is also covered by the overlapping area 802-2 based on three camera views. The resulting partition of the viewing are 802 is thus unique, i.e., for each point in the viewing area of the virtual view 322, there is uniquely associated a selection of either two or three camera views.

In the case of four or more overlapping camera views, there is more than one selection of three overlapping camera views. In this case, the selection step 406 is based on a further criterion, such as an image quality of the three overlapping camera views. The image quality is quantified, e.g., by computing an entropy measure of the image for the overlapping camera views. The three camera views having the highest image quality are selected in the step 406.

In one implementation of the method 400, the determination of the overlapping areas 802 in the viewing area 602 of the virtual view 322 is a sub-step of the selection step 406. In another implementation of the method 400, the step of determining the overlapping areas 802 is completed prior to the selection step 406.

For example, the image of the virtual view 322 is computed pixel-by-pixel in the steps 406 and 408. For each given pixel, the overlapping two or three camera views are selected in the step 406 based on the part of the determined partition, or the determined overlapping area 802, to which the given pixel belongs. As an alternative example, the image of the virtual view 322 is computed independently for each part of the partition, or for each overlapping area 802. The overlapping areas 802 are determined and optionally reduced for the partition of the viewing area 602 of the virtual view 322. Pixels of the image within each part of the partition are computed based on the multilinear relation between the selected two or three camera views corresponding to the part of the partition. The computation 408 can be performed sequentially for each part of the partition. Preferably, the computation is performed in parallel by independent processes and/or different hardware implementations of the computing unit 320 for each part of the partition.

The camera view 322 may be defined by its parameters, e.g., some or all of the internal or external parameters described with reference to FIG. 5. Some or all of the parameters defining the virtual view may change, e.g., as a function of time, depending on motion detected in one or more of the camera views or the virtual view 322, or any other signal provided by a sensor or a user. The determination of the partition, the selection 406 and the computation 408 are repeated for a changed virtual view 322'. The overlapping area 802-1' corresponds to the selection of the camera views 316 and 317.

In an advanced implementation of the method 400, the determination of a partition is not limited to the partition of the virtual view 322. Alternatively or in addition, a partition of parameter space is determined. The partition is representable by a mesh 1000 schematically illustrated in FIG. 10. The mesh 1000 is indicative of the partition and associates two or three overlapping camera views to be selected with each part of the partition. The mesh 1000 is stored in memory, e.g., included in the selecting unit 318.

The parameter space is the space spanned by the one or more parameters that are, or are expected to be, subject to change. Each parameter set, e.g., each of the parameter sets of the camera views 312 to 317, is represented by a point in the parameter space. Each point in parameter space corresponding to one of the plurality of camera views 312 to 317 defines a vertex of the mesh 1000. For the simplicity of the illustration in FIG. 10, the vertices are indicated by the reference sign of the corresponding camera view. The virtual view 322 is also represented, according to its parameters, by a point in the parameter space. Since at least two camera views are required for computing the image of the virtual view 322, the point representing the virtual view 322 is restricted to a convex hull 1002 defined in the parameter space by vertices of the mesh 1000. The convex hull 1002 is compact. Particularly, the border of the convex hull 1002 is accessible to the virtual view 322 and is associated to a selection of two camera views, as is shown for the exemplary virtual camera view 322'.

Figure 10:
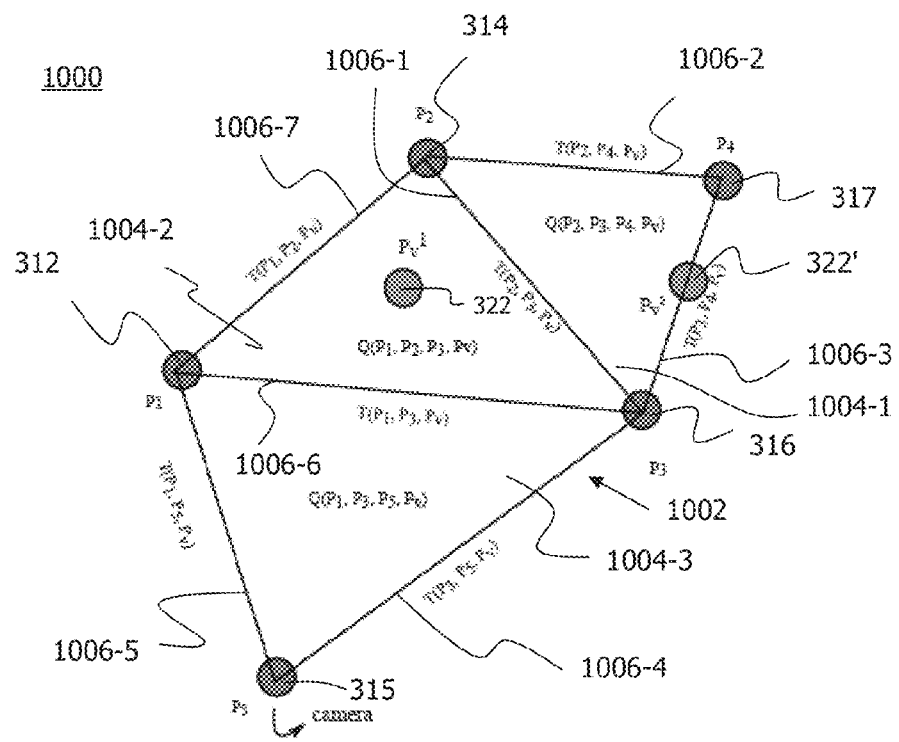
FIG. 10 shows an exemplary mesh for selecting two or three camera views depending on parameters for the virtual view.

While the mesh 1000 is schematically illustrated in a two-dimensional plane for the clarity of the illustration in FIG. 10, the parameter space can be three-dimensional including the translational degrees of freedom 502 for the virtual view 322, or any other number of parameters of the virtual view 322. For example, the parameter space can include all six external parameters 502 and 504, and the three internal parameters representing the image distance 512 (e.g., for changing the zoom level) and the position of the viewing area 602 within the projection plane 509 (e.g., the two degrees of freedom representing the principle point 510).

For a given set of parameters, the mesh 1000 indicates which pair or triple of overlapping camera views is to be selected in the step 406, and/or which trifocal tensor or quadrifocal tensor is to be used in the computation step 408. The mesh 1000 does not have to represent the full parameter space. The mesh 1000 does not have to be embedded in the parameter space. The mesh 1000 can have a two-dimensional representation independent of the dimension of the parameter space. The mesh 1000 represents a topology of pairs and triples of overlapping camera views.

Continuous changes of the virtual view 322 relative to the camera arrangement 302 thus give rise to a trajectory of intersections of the changing virtual view 322 with the camera views. The two or three overlapping camera views are readily selected based on the partition of the parameter space defined by the mesh 1000 for the convex hull 1002. For example, if the virtual view 322 is within a part 1004-1 of the partition, the camera views 314, 316 and 317 are selected in the step 406. Within a part 1004-2 of the partition, the camera views 312, 314 and 316 are selected. Within a part 1004-3 of the partition, the camera views 312, 315 and 316 are selected. At a border 1006-1 of the part 1004-1 and the part 1004-2, the camera views 314 and 316 are selected. Similarly, two camera views are selected, if the parameters of the virtual view 322 are at one of the borders 1006-2 to 1006-7.

The determination of the partition of the parameter space and the determination of the partition of the viewing area 602 of the virtual view 322 are performed successively. Alternatively, the determination of the partition of the viewing area 602 of the virtual view 322 (as described with reference to FIG. 9) and the determination of a partition of the parameter space (as described with reference to FIG. 10) can be combined into a step of determining a partition for a combined configuration space. The mesh 1000 is indicative of the partition of the combined configuration space and associates two or three overlapping camera views to be selected with each part of the partition. The combined configuration space includes, e.g., a product space defined by the product of the parameter space and the viewing area 602 of the virtual view. Alternatively, the combined parameter space is a fiber bundle having the parameter space as a base space and the parameterized viewing areas 602 of the virtual view 322 as fibers.

A selection of two or three camera views is stored in association with each part of the partition of the combined configuration space. By retrieving the part of the stored partition corresponding to a given virtual view 322 in combination with a given point in the viewing area 602 of the virtual view 322, the camera views are selected in the step 406.

In a first embodiment of the method 400, the multilinear relation relating the selected camera views and the desired virtual view 322 is computed based on the parameters of the virtual view 322. For example, the multilinear relation is parameterized, i.e., the multilinear relation is computed as a function of the parameters of the virtual view 322. For computing the virtual view 322 for a certain set of parameters of the virtual view 322, coefficients representing the multilinear relation are evaluated once for each part of the partition. The coefficients of the multilinear relation are applied for a plurality of pixels, including at least the pixels belonging to the corresponding part of the partition.

In a second embodiment of the method 400, the multilinear relation is computed based on the projection matrices, P, of the selected camera views and the virtual view 322. For example, the multilinear relation for combining three views, e.g., two camera views 312 and 314 and one virtual view 322, is representable by a trifocal tensor, T $(P_{312}, P_{314}, P_{322})$.

The trifocal tensor, T, is applied, if the virtual view 322 is on one of the edges in the mesh 1000, e.g., on the edge 1006-7. The multilinear relation relating four different views, e.g., three camera views 312, 314 and 316 and one virtual view 322, is representable by a quadrifocal tensor, Q ($P_{312}$, $P_{314}$, $P_{316}$, $P_{322}$). The quadrifocal tensor, Q, is applied, if the virtual view 322 is within one of the parts of the partition, e.g., within the part 1004-2.

At least the projection matrix, $P_{322}$, of the virtual view 322 is parameterized. By computing the multilinear relation as a function of the projection matrices of the related views, the multilinear relation is a function of the parameters of the virtual view 322. The projection matrices of the camera views are determined using conventional camera calibration techniques, examples of which are published in aforementioned technical report MSR-TR-98-71.

Figure 11:
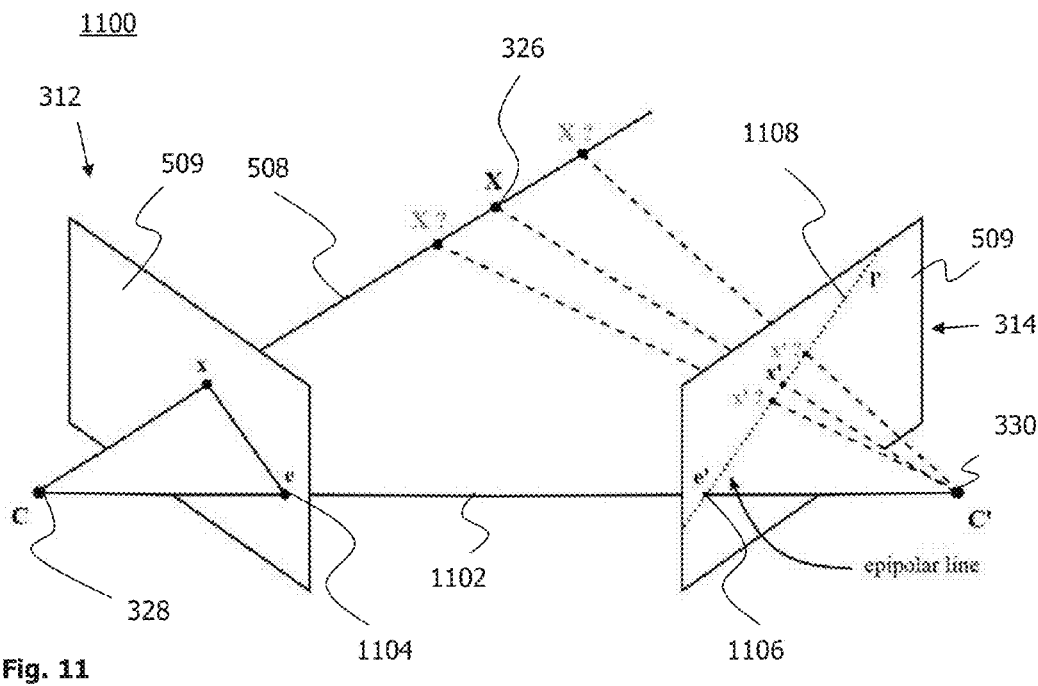
FIG. 11 schematically illustrates a bilinear relation between two different views.

FIG. 11 schematically illustrates a multilinear relation 1100 that relates two different overlapping views 312 and 314. For a given point x in the view 312, the corresponding point X of an object 326 in the scene 324 is located on the ray 508 defined by the projection center 328 and the point x in the view 312. A straight line 1102, which is denoted by baseline and which connects the projection centers 328 and 330 of the views 312 and 314 to be related, intersects each of the projection planes 509 of the views 312 and 314 at epipoles 1104 and 1106, respectively.

As is indicated by question marks in FIG. 11, the position X of the object 326 is constrained by the ray 508 defined by the projection center 328 and the point x of the view 312. Projecting the ray 508 according to the projection of the view 314 results in a line 1108, which is the epipolar line l' in the view 314 corresponding to the point x in the view 312. The point x in the view 312 thus determines the epipolar line l' in the projection plane 509 of the view 314. The relationship between the two different views 312 and 314 can be described by a linear mapping:

$$x \rightarrow l': l' = Fx. \qquad \text{(Eq. 8)}$$

The linear mapping is represented by the fundamental matrix F. The epipolar line 1108 is described by its normal vector l' in the projection plane 509. Thus, a point x in the view 312 is related to a point x' in the view 314 by the bilinear relation:

$$x'^T F x = 0. \qquad \text{(Eq. 9)}$$

According to the homogeneous coordinates for the points x and x' in the related views 312 and 314, the fundamental matrix has dimension dim F=3×3 including 9 elements. Evidently, Eq. 9 is scale-invariant. I.e., the fundamental matrix F can equally be represented by $\lambda \cdot F$ for any $\lambda > 0$. Furthermore, the determinant of the fundamental matrix is zero, i.e., det F=0. Due to these two constraints, the fundamental matrix has 9−2=7 degrees of freedom.

The fundamental matrix represents the bilinear relation 1100 by linearly relating two different overlapping views, such the views 312 and 214 shown in FIG. 11. The physical meaning of the fundamental matrix is a point-line correspondence according to Eq. 8 or Eq. 9. The fundamental matrix, F, maps a two-dimensional projective space, namely the space of rays 508 for the first view 312, onto a one-dimensional projective space, namely the space of epipolar lines 1108 in the projection plane 509 of the second view 314. The present disclosure uses in the step 408 of computing the image of the virtual view 322 a multilinear relation that relates at least three different views. The parameterized fundamental matrix is optionally used in a sub-step of the computation step 408.

The bilinear relation 1100, i.e., the fundamental matrix F(P, P'), is computed as a function of the projection matrices $P=P_{312}$ and $P'=P_{314}$ of the related two different views 312 and 314. The projection 500 of the point X of the object 326 onto the projection plane 509 of the view 312 and the projection 500 according to the view 314 require that the set of equations, kx=PX for some value k>0, and $$k'x'=P'X \text{ for some value } k'>0, \qquad \text{(Eq. 10)}$$

is fulfilled. Eq. 10 can be rewritten in the form of a homogeneous linear equation:

$$\begin{bmatrix} P & x & \\ P' & & x' \end{bmatrix} \begin{pmatrix} X \\ -k \\ -k' \end{pmatrix} = 0. \qquad \text{(Eq. 11)}$$

Since the homogeneous linear Eq. 11 has a non-trivial solution, the 6×6-coefficient matrix in square brackets on the left-hand side of Eq. 11 must have a determinant equal to zero. Since the coordinates of each of the points x and x' in the views 312 and 314, respectively, are in one separate column of the columns of the coefficient matrix in Eq. 11, the determinant of the coefficient matrix is linear in the coordinates of each of the points. In other words, evaluating the determinant, e.g., by Leibniz' formula or Laplace's formula, results in the bilinear relation of Eq. 9 with F=F(P, P').

Figure 12:
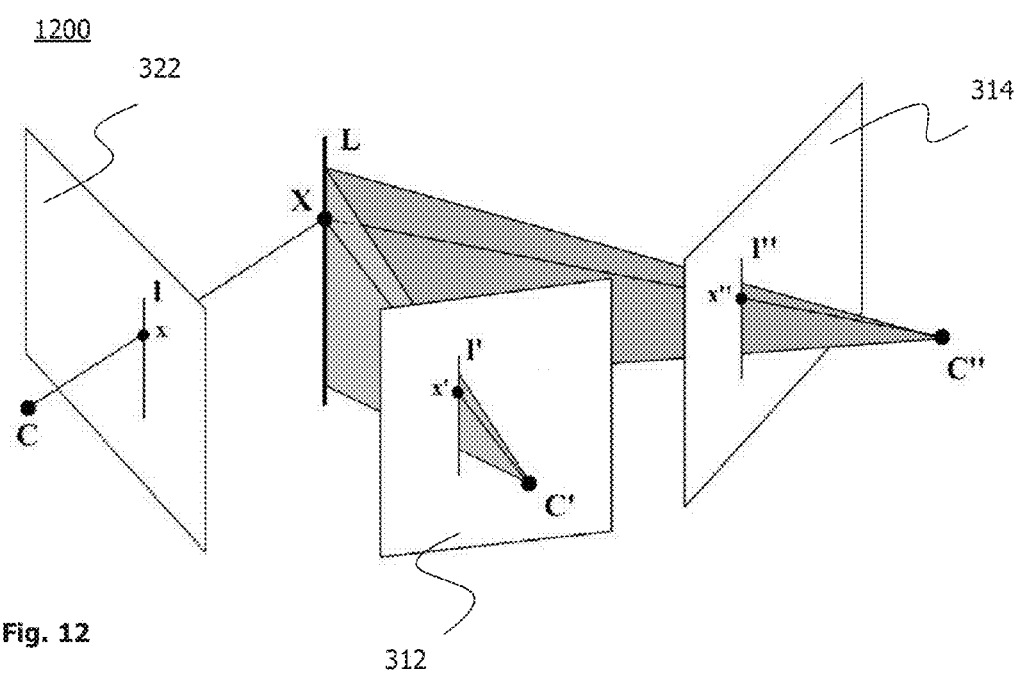
FIG. 12 schematically illustrates a trilinear relation between three different views.

FIG. 12 schematically illustrates a multilinear relation 1200 that relates three different overlapping views 312, 314 and 322. The spatial point X of the object 326 is projected to the corresponding points x, x' and x" in the views 312, 322 and 314, respectively. In terms of the corresponding projection matrices, P, P' and P", the projections are described by the homogeneous linear equation system:

$$\begin{bmatrix} P & x & & \\ P' & & x' & \\ P'' & & & x'' \end{bmatrix} \begin{pmatrix} X \\ -k \\ -k' \\ -k'' \end{pmatrix} = 0. \qquad \text{(Eq. 12)}$$

Each of the projection matrices P, P', P" has dimension 3×4 so that the coefficient matrix in square-brackets on the left-hand side of Eq. 12 has dimension 9×7 and has a rank of 6, at the most. Therefore, all of its minors of size 7×7 have a determinant equal to zero. For computing any one of the minors of the coefficient matrix, 2 out of the 9 rows of the coefficient matrix are excluded. Consequently, there are $$\binom{9}{2} = (9 \cdot 8)/(1 \cdot 2) = 36 \qquad \text{(Eq. 13)}$$

equations as part of the trilinear relation 1200. Out of the 36 equations, 9 equations relate 3 rows including coordinates for one of the views (i.e., the entire set of coordinates for one image point) and 2 rows including coordinates for each of the two other views. These 9 equations for the trilinear relation 1200 can be summarized as $$x_i x_j' x_k'' \epsilon_{jqu} \epsilon_{krv} T_i^{qr} = 0_{uv},\qquad(\text{Eq. 14})$$

wherein the trifocal tensor T is represented by its tensor components $T_i^{qr}$, i.e., the coefficients of the trilinear relation 1200. The trifocal tensor, $T=T(P, P', P'')$, is thus a function of the projection matrices of the three different overlapping views.

A point correspondence between one point in each of the three related views is determined by the trilinear Eq. 14. The symbol $\epsilon$ in Eq. 14 is the totally asymmetric tensor. Contracting each of the totally asymmetric tensors with the coordinates of one of the points x' and x'', results in a point-line-line correspondence between the point x and the lines l' and l'' shown in FIG. 12:

$$x_i l_q' l_r'' T_i^{qr} = 0.\qquad(\text{Eq. 14'})$$

The trilinear relation according to Eq. 14 can also be represented as a point-line-point correspondence by contracting one of the totally asymmetric tensors:

$$x_i l_q' x_k'' \epsilon_{krv} T_i^{qr} = 0_v.\qquad(\text{Eq. 14''})$$

Using the trilinear relation, e.g. according to any one of the Eqs. 14, 14' or 14'', the coordinates of the point x in the virtual view 322 are computed based on corresponding objects (i.e., a line object or a point object) in each of the two selected camera views.

An explicit computation of the trifocal tensor T as a function of the projection matrices of the different overlapping views related by the trilinear relation is described. The coefficients, $T_i^{qr}$, of the trilinear relation 1200 according to Eq. 14 can be computed based on a sufficient number of point correspondences, i.e., point objects included in each of the three overlapping views. Since the image points for the virtual view 322 are to be computed, it is not possible to calculate the trifocal tensor T directly by point correspondences.

The projection matrices of the three overlapping views are grouped or allocated in memory as a concatenation of row vectors, $$P = \begin{bmatrix} P_1^T \\ P_2^T \\ P_3^T \end{bmatrix}, \quad P' = \begin{bmatrix} P_1'^T \\ P_2'^T \\ P_3'^T \end{bmatrix}, \quad P'' = \begin{bmatrix} P_1''^T \\ P_2''^T \\ P_3''^T \end{bmatrix},\qquad(\text{Eq. 15})$$

and the trifocal tensor $T_i^{jk} = [T_1, T_2, T_3]$ is computed by the computing unit 320 according to:

Eq. 16 is derivable by evaluating the 9 vanishing minors mentioned above with reference to Eqs. 12 to 14. As is evident from Eq. 16, the coefficients of the trifocal tensor are calculated from determinants of matrices, which are formed by the row vectors of projection matrices given in Eq. 15. The computation of the trifocal tensor T is implemented in hardware by the computing unit 320.

The trifocal tensor T is computed as a function of the three projection matrices. Two of the matrices, $P_{312}$ and $P_{314}$, specify the selected cameras views. The third matrix $P_{322}$ is determined by the desired virtual view 322. The projection matrix $P_{322}$ is the only variable that will be changing, e.g., according to the point of view of the virtual view 322. To increase real-time performance of the device 304, the trifocal tensor is parameterized in terms of the projection matrix $P_{322}$, $T=T(P_{322})$. Once the projection matrices of the plurality of cameras in hardware are calculated, e.g., by conventional calibration techniques, a set of parameterized trifocal tensors is computed for neighboring camera views in the mesh 1000. Depending on the parameters of the virtual view 322, e.g., the point of view 334 of the virtual view 322, the corresponding parameterized trifocal tensor is used in the computation step 408 as a mapping from the camera views 312 and 314 to the virtual view 322, as is illustrated in FIG. 3b.

Figure 13:
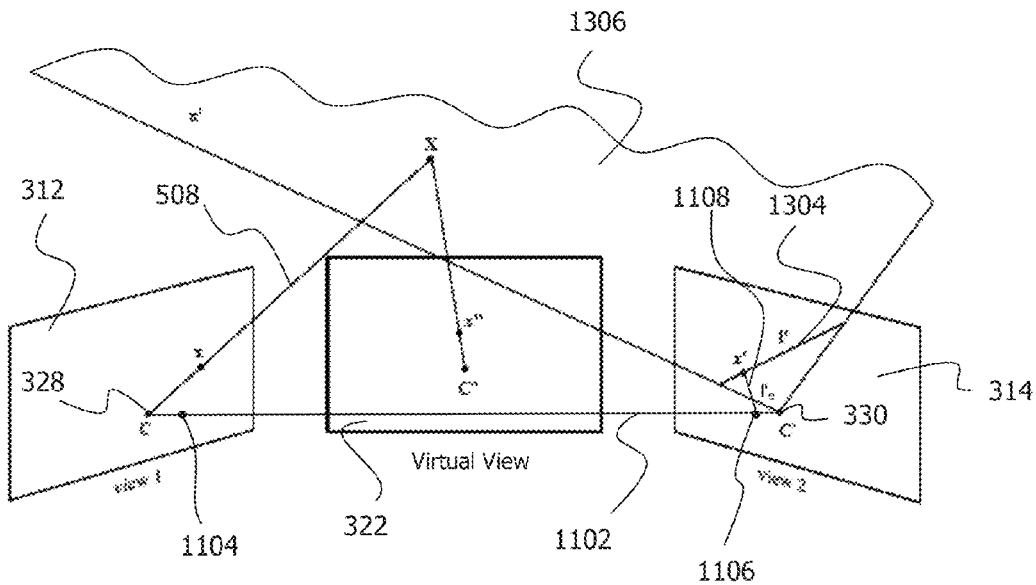
FIG. 13 schematically illustrates a point transfer using the trilinear relation.

FIG. 13 schematically illustrates the step 408 of computing the image of the virtual view 322 using the trilinear relation 1200. The fundamental matrix $F_{21}$, i.e. the bilinear relation 1100 between the view 312 and the view 314, is determined as described with reference to FIG. 11 or retrieved from the trifocal tensor T. The sub-step of retrieving the fundamental matrix $F_{21}$ includes:

(a) determining the epipoles e and e' in the camera views 312 and 314, respectively, by computing the left and right null-space vectors denoted by $u_i$ and $v_i$, respectively, according to $u_i^T T_i = 0^T$, $T_i v_i = 0$, and obtaining the epipoles 1104 and 1106 according to:

$$e^T[u_1, u_2, u_3] = 0 \text{ and } e'^T[v_1, v_2, v_3] = 0; \text{ and}$$

(b) computing the fundamental matrix $F_{21}$ according to:

$$F_{21} = [e]_\times [T_1, T_2, T_3] e'.$$

In a further sub-step of the step 408, the epipolar line $l'_e$ (shown at reference sign 1108 in FIG. 13) corresponding to the point x is computed according to Eq. 8. In a further sub-step of the step 408, a line l' (shown at reference sign 1304) through x' and perpendicular to $l'_e$ is determined. The back-projection of the line l' corresponds to a plane n' (indicated by reference sign 1306) in space. The point X in space is thus determined by the intersection of the ray 508 and the plane 1306. In a still further sub-step of the step 408, $$T_1 = \begin{bmatrix} |P_2, P_3, P_1', P_1''| & |P_2, P_3, P_1', P_2''| & |P_2, P_3, P_1', P_3''| \\ |P_2, P_3, P_2', P_1''| & |P_2, P_3, P_2', P_2''| & |P_2, P_3, P_2', P_3''| \\ |P_2, P_3, P_3', P_1''| & |P_2, P_3, P_3', P_2''| & |P_2, P_3, P_3', P_3''| \end{bmatrix}$$

$$T_2 = \begin{bmatrix} |P_3, P_1, P_1', P_1''| & |P_3, P_1, P_1', P_2''| & |P_2, P_1, P_1', P_3''| \\ |P_3, P_1, P_2', P_1''| & |P_3, P_1, P_2', P_2''| & |P_2, P_1, P_2', P_3''| \\ |P_3, P_1, P_3', P_1''| & |P_3, P_1, P_3', P_2''| & |P_2, P_1, P_3', P_3''| \end{bmatrix}.$$

$$T_3 = \begin{bmatrix} |P_1, P_2, P_1', P_1''| & |P_1, P_2, P_1', P_2''| & |P_1, P_2, P_1', P_3''| \\ |P_1, P_2, P_2', P_1''| & |P_1, P_2, P_2', P_2''| & |P_1, P_2, P_2', P_3''| \\ |P_1, P_2, P_3', P_1''| & |P_1, P_2, P_3', P_2''| & |P_1, P_2, P_3', P_3''| \end{bmatrix}$$

(Eq. 16)

the coordinates of the corresponding point x''' in the virtual view 322 are computed according to:

$$x'''=T_i{}^{qr}x^i l_q{}'.\quad\text{(Eq. 17)}$$

Figure 14:
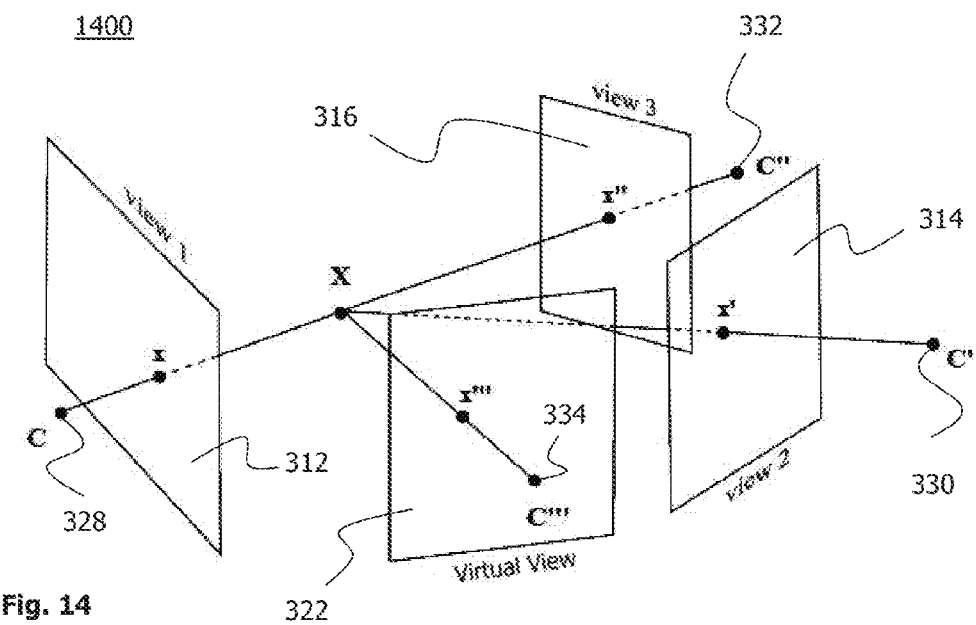
FIG. 14 schematically illustrates a quadrilinear relation between four different views.

FIG. 14 schematically illustrates a quadrilinear relation 1400 for an exemplary arrangement of three overlapping camera views 312, 314 and 316 and one virtual view 322, so that the viewing area of the virtual view 322 includes an overlapping area 802 of the three camera views 312 to 316. The four projections of the views can be written, similar to Eq. 12 in the case of the trilinear relation 1200, as a homogeneous linear equation system:

$$\begin{bmatrix} P & x & & & \\ P' & & x' & & \\ P'' & & & x'' & \\ P''' & & & & x''' \end{bmatrix} \begin{pmatrix} X \\ -k \\ -k' \\ -k'' \\ -k''' \end{pmatrix} = 0. \quad\text{(Eq. 18)}$$

Computing the vanishing minors of the coefficient matrix on the left-hand side of Eq. 18 results in the quadrilinear relation, $$x^i x'^j x''^k x'''^l \epsilon_{ipw}\epsilon_{jqx}\epsilon_{kry}\epsilon_{lsz} Q^{pqrs}=0_{wxyz},\quad\text{(Eq. 19)}$$

wherein the quadrifocal tensor Q=Q(P, P', P'', P''') is a function of the four projection matrices of the four views 312, 314, 316 and 322. Given three corresponding points, x, x' and x'', in the three selected camera views, the position of a corresponding point x''' in the virtual view 322 is computed based on Eq. 19.

In one implementation of the computation step 408, Eq. 19 is solved for x''', if the camera views are not in a degenerate configuration. The multilinear relations 1200 and 1400, which are used for computing the corresponding point in the virtual view 322 based on two camera views and three camera views, respectively, differ only in the dimension of the tensor, T or Q, defining the multilinear relation between the corresponding points. Therefore, a discussion of details for computing the point in the virtual view 322 based on a point object and/or a line object in each of the camera views can be omitted for the quadrilinear relation.

Furthermore, while the multilinear relations 1100, 1200 and 1400 have been described for converging camera views, to the benefit of a clear illustration in FIGS. 12 to 14, the multilinear relations also apply to a configuration of camera views, wherein the optical axes of the camera views are pointed in divergent directions, examples of which are described below with reference to FIGS. 15 to 20.

Spatial structures of embodiments of the camera arrangement 302 are described. For a compact arrangement for the plurality of cameras in hardware, the embodiments are based on a spherical arrangement of the cameras, i.e., the cameras or their projection centers are at equal distance from a centroid. In addition, in order to maintain the spherical symmetry for the plurality of camera views, the cameras are spread around the sphere, so that the distances between the neighboring cameras are all equal. The optical axes are orthogonal to the sphere.

Figure 15:
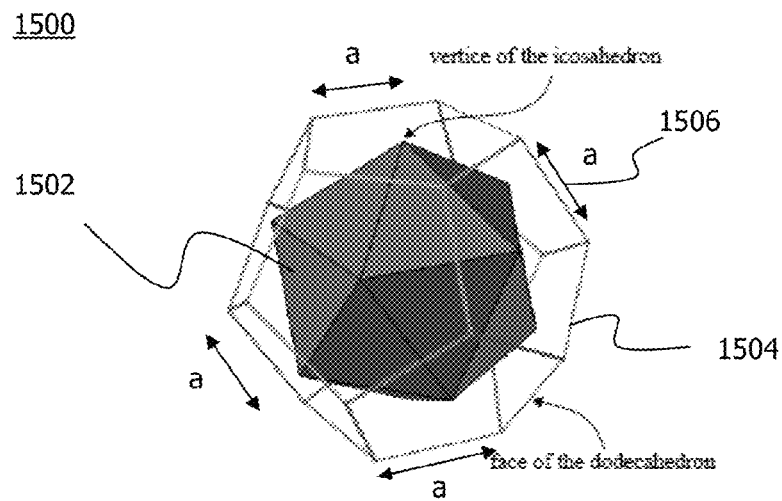
FIG. 15 schematically illustrates dual polyhedrons.

For a spherical arrangement of N cameras, the locations of the cameras or their projection centers correspond to vertices of the polyhedron formed by the convex hull of N points. All the edge lengths are equal. A camera arrangement 302 for N=4 cameras in hardware is based on a tetrahedron (which consists of 4 vertices, 6 edges and 4 faces). For a camera arrangement 302 including N=6 cameras in hardware, the cameras are arranged at the vertices of an octahedron (which consists of 6 vertices, 12 edges and 8 faces). For a camera arrangement including N=8 cameras in hardware, the locations of the cameras are the vertices of a cube (which consists of 8 vertices, 12 edges and 6 faces). FIG. 15 schematically illustrates an icosahedron 1502 centered inside a dodecahedron 1504 as a geometrical structure 1500 for a camera arrangement 1600 shown in FIG. 16.

The dodecahedron 1504 shown in FIG. 15 consists of 20 vertices, 30 edges and 12 faces. A plurality of N=12 cameras in hardware is arranged at the centers of the faces of the dodecahedron 1504. Since the icosahedron 1502 is the dual of the dodecahedron 1504, the camera positions or projection centers are equally represented by the vertices of the icosahedron 1502. For an edge length 1506 of the dodecahedron 1504 equal to a, the projection centers of the plurality of cameras in hardware are at a distance r from the centroid 1602 of the camera arrangement 1600. The radial distance from the centroid 1602 of the camera arrangement 1600 is related to the edge length 1506 by:

$$r = a\frac{1}{2}\sqrt{\frac{5}{2} + \frac{11}{10}\sqrt{5}}.\quad\text{(Eq. 20)}$$

The camera arrangement 1600 further includes a frame 1604 having the shape of the dodecahedron 1504. For an edge length of a=10 cm of the frame 1604, the radial distance 1606 between the centroid 1602 and each of the plurality of cameras is approximately r=11.1 cm. The frame 1604 is made from a plastic material. The frame 1604 is preferably elastic. The projection matrices of the camera views are adjusted in real-time in response to strain in the frame 1604.

Figure 16:
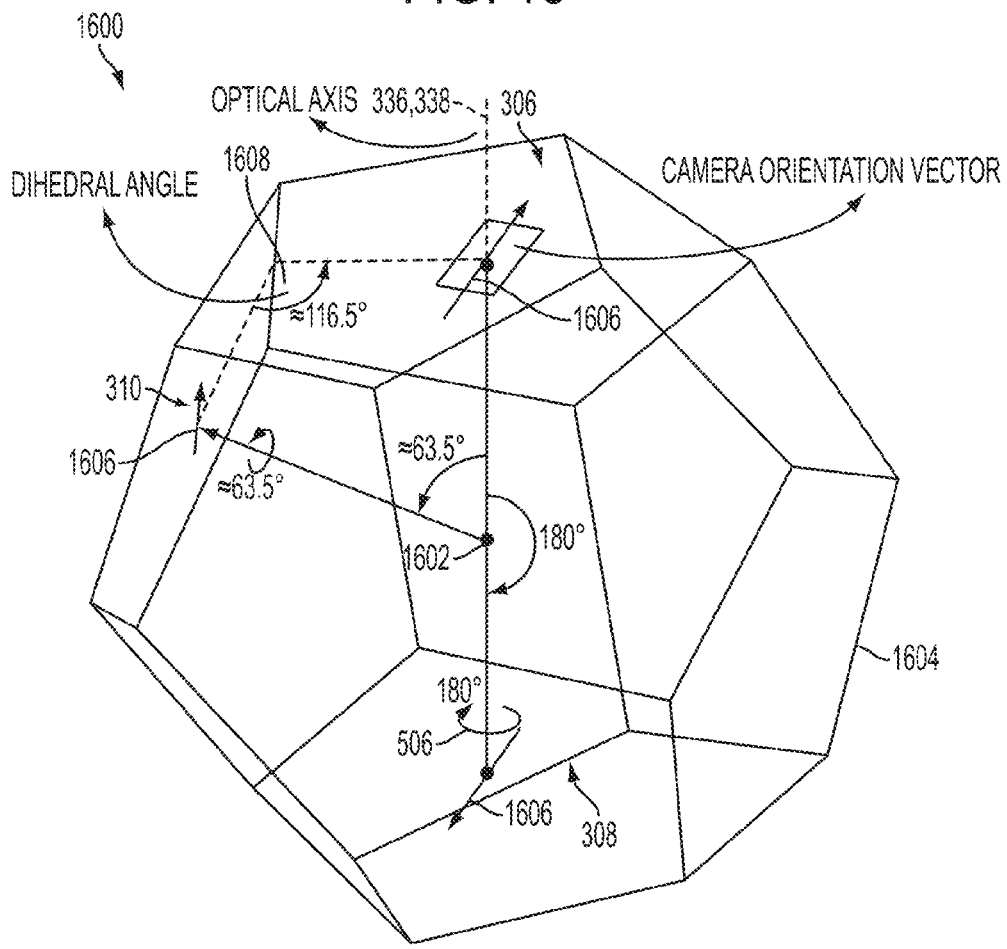
FIG. 16 schematically illustrates a spherically symmetric camera arrangement.

Three cameras 306, 308 and 310 of the plurality of 12 cameras in hardware are schematically illustrated for the clarity of the camera arrangement 1600 shown in FIG. 16. Each camera in hardware includes a lens providing a horizontal opening angle 604 of 75 degrees and a vertical opening angle 608 of 56 degrees. Thus, each of the cameras in hardware covers a non-Euclidean rectangular area and the projected viewing area 602 has approximately an aspect ratio of 4:3.

Since the projection centers of the plurality of cameras in the camera arrangement 1600 is spaced-apart from the centroid 1602, there is a minimum radius $r_{min}$ for the camera views to overlap. In order to minimize the minimum radius, i.e., in order to minimize "blind spot areas", the orientation of the plurality of cameras about their optical axis is optimized. This optimization relates to the rotation 506. In order to maintain the spherical symmetry of the plurality of camera views while the entire camera arrangement 1600 is rotating, the orientation of each of the plurality of cameras about its optical axis is so that the change in the orientation caused by a rotation of the camera arrangement 1600 is independent of the direction of rotation (e.g., an azimuthal rotation along latitudes, a polar rotation along longitudes, or any other direction of rotation).

As is shown for the antipodal cameras 306 and 308, the dodecahedral frame 1604 has six pairs of opposite faces, each of which is a regular pentagon. The orientation of each of the plurality of camera views is represented by a vector 1606 indicative of the direction of the horizontal axis in the projection plane 509. The vectors 1606 of antipodal camera views are aligned and in opposite directions, in fulfillment of the spherical symmetry condition. Since the dihedral angle 1608 between adjacent faces of the dodecahedron 1504 is approximately φ=116.5 degrees, the vectors 1606 of adjacent faces encloses an angle of φ'=63.5 degrees. For manufacturing the camera arrangement 1600, the frame 1604 is rotated from one face of the dodecahedron 1504 to a next-adjacent face, and each time a camera of the plurality of cameras is mounted onto the next-adjacent face, the camera to be mounted next is rotated about its optical axis by 63.5 degrees relative to the previously mounted camera.

The external parameters of each of the plurality of camera views, which are used for computing the projection matrix for each of the camera views, are described with reference to FIG. 17. The positions and orientations of the cameras included in the camera arrangement 1600 are computed by a series of rotations of the vector 1606. Each rotation in the series of rotations is described by Euler angles γ, β and γ', respectively. Each of these angles represents a rotation about an axis of a reference coordinate system, which is also subject to the same rotation operation. The first angle of rotation, γ, specifies the first rotation of the vector 1606 about the z-axis of the reference coordinate system, as is illustrated in FIG. 17a. The second angle of rotation, β, specifies the second rotation about the x-axis of the rotated reference coordinate system obtained by the first rotation. The second rotation is illustrated in FIG. 17b. Similarly, the third angle of rotation, γ', specifies the third rotation about the z-axis of the further rotated coordinate system obtained by the second rotation. The third rotation is illustrated in FIG. 17c.

A position of one of the cameras is defined by a vector $X_0$. In fulfillment of above requirements as to the spherical symmetry of the positions and orientations of the plurality of cameras, the i-th camera is arranged at $X_i$ according to:

$$X_1 = R_z(\pi)X_0$$
$$X_{2k} = R_{z''}(\pi - \theta)R_{x'}(\pi - \theta)R_z\left(\frac{2\pi k}{5}\right)X_0 \quad k = 1, \ldots, 5$$
$$X_{2k+1} = R_{z''}(\pi - \theta)R_{x'}(\pi - \theta)R_z\left(\frac{2\pi k}{5}\right)X_1$$

wherein θ is the dihedral angle, and wherein $R_z$, $R_{x'}$ and $R_{z''}$ are rotation matrices defined by:

$$R_z(\gamma) = \begin{bmatrix} \cos\gamma & -\sin\gamma & 0 \\ \sin\gamma & \cos\gamma & 0 \\ 0 & 0 & 1 \end{bmatrix} \quad R_y(\beta) = \begin{bmatrix} \cos\beta & 0 & \sin\beta \\ 0 & 1 & 0 \\ -\sin\beta & 0 & \cos\beta \end{bmatrix}$$

$$R_z(\gamma') = \begin{bmatrix} \cos\gamma' & -\sin\gamma' & 0 \\ \sin\gamma' & \cos\gamma' & 0 \\ 0 & 0 & 1 \end{bmatrix}.$$

Hardware components installed in the frame 1604 have different geometries and masses. The installed components include Micro Electro-Mechanical Systems (MEMS) for sensing acceleration, the units 318 and 320 of the device 304, and/or a baseband chips for wireless communication. In addition to the spherical symmetry of the camera arrangement 1600, the mass of all components mounted to the frame 1604 has to be distributed so that the centroid 1602 of the mass distribution coincides with the center of the dodecahedral frame 1604. Furthermore, since the camera arrangement 1600 is allowed to rotate about any axis passing through its center, an uneven mass distribution would unbalance the system while it rotates. Therefore, the components are mounted so that the mass distribution of all components is spherically symmetric. I.e., the moment of inertia tensor of the camera arrangement 1600 has three equal eigenvalues. In other words, the moment of inertia is equal for three different axes through the center.

FIGS. 18a and 18b schematically illustrate examples of overlapping camera views selected in the step 406 and used for computing the virtual view 322 in the step 408 for the camera arrangement 1600. In the part of the overlapping area in the virtual view for two or three overlapping camera views, the virtual view is synthesized in the step 408 by means of a point-transfer computation based on the trilinear relation 1200 (e.g., as outlined with reference to FIG. 13) and the quadrilinear relation 1400, respectively. FIG. 18a illustrates the case of selecting two overlapping camera views 312 and 314 in the step 406. FIG. 18b schematically illustrates the selection of three camera views 312, 314 and 316 in the step 406 for computing the virtual view 322 in the step 408.

Figure 19:
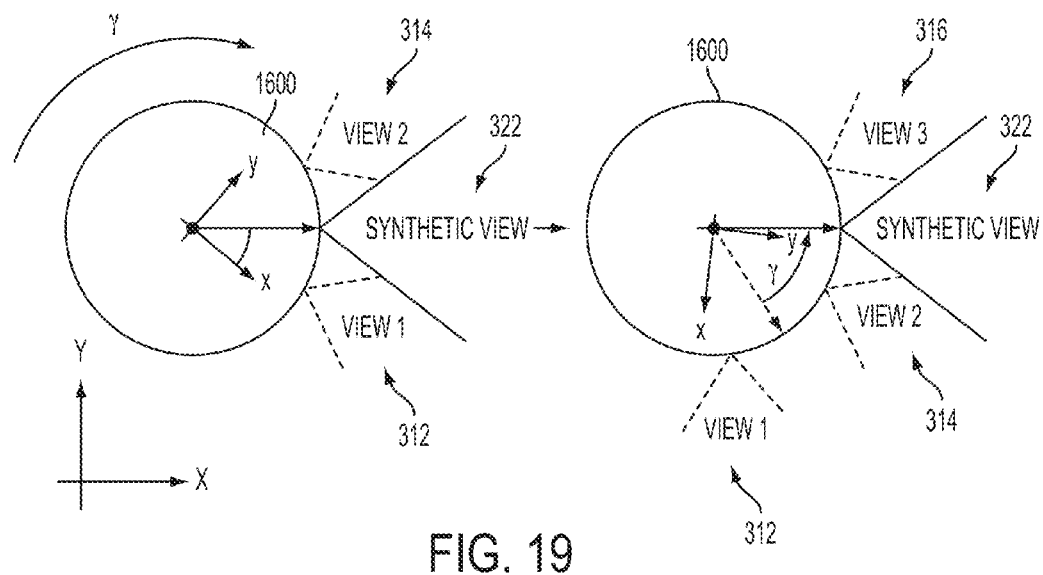
FIG. 19 schematically illustrates a changing selection of overlapping camera views.

FIG. 19 schematically illustrates a time-dependent virtual view 322. In one use case, the time-dependent virtual view 322 preserves a direction of the optical axis 342 of the virtual view 322 in space while the camera arrangement, e.g., the camera arrangement 302 or 1600, is rotating. In another use case, the virtual view 322 is constantly directed towards an object 326 while the object is passing by the camera arrangement and, optionally, while the camera arrangement is rotating. Alternatively or in addition, the virtual view 322 may be arbitrarily chosen during operation of the camera arrangement in data communication with the device 304, or after recording based on a plurality of recorded camera views.

At first, the internal parameters of the virtual view 322 are set to be equal to the internal parameters of one of the camera views. The internal parameters define the matrix K used for computing the projection matrix of the virtual view 322 according to Eq. 7. As to the external parameters, a vector $\tilde{C}_v$ specifies the position 334 of the virtual view 322. A rotation matrix $R_v$ specifies the orientation 504 of the virtual view 322.

By way of example, the virtual view 322 is positioned at the same distance r from the centroid 1602 of a spherically symmetric camera arrangement, e.g., the camera arrangement 1600. The position 334 of the virtual view 322 is computed using the rotation matrix $R_v$ according to:

$$\tilde{C}_v = R_v \begin{bmatrix} r \\ 0 \\ 0 \end{bmatrix}.$$

Similar to the positions of the cameras in hardware, the orientation of the virtual view 322 is computed by a series of three rotations about the axes of an orthogonal coordinate system. Euler angles γ', β and γ are consistently used to determine the rotation about the Z-, Y- and Z'-axes, respectively.

In one implementation, the rotation matrix $R_v$, which is used for both computing the position and the orientation of the virtual view 322, is computed according to:

$$R_v = R_z(\gamma')R_y(\beta)R_z(\gamma)$$

$$= \begin{bmatrix} \cos\gamma' & -\sin\gamma' & 0 \\ \sin\gamma' & \cos\gamma' & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix}.$$

The representation of external parameters is not restricted to above ZYZ-representation. The ZYZ-representation has the advantage of complying with the numerical representation used in the computation of the camera arrangement 1600. In another implementation, a different representation of Euler angles is implemented.

The values of the three angles of rotation, γ', β and γ, are derived from motion sensors mounted within the frame 1604.

The parameters of the virtual view are changing during the rotational and/or translational motion of the camera arrangement, as is illustrated in FIG. 19 for the camera arrangement 1600 rotating about its center. For example, to stabilize the virtual view 322 in the one use case, the rotational parameters, e.g. $R_v^T$, of the virtual view 322 are rotated in the reverse direction of the rotation, e.g. $R_v$, of the camera arrangement 1600.

As illustrated in FIG. 19, the camera views selected for the computation of the image of the virtual view 322 also change during the motion of the camera arrangement. For the camera arrangement 1600, two cases are distinguished according to a number of camera views that overlap with the virtual view 322. Depending on the current position 334 and orientation 342 for the virtual view 322, the virtual view 322 of the virtual camera is covered either by two camera views, as shown in FIG. 18a, or by three camera views, as shown in FIG. 18b.

As an exemplary use case of the time-dependent virtual view 322 in combination with a spherically symmetric arrangement 1600 of the plurality of cameras in hardware, the camera arrangement 1600 is included in a ball, e.g., a soccer ball or a gridiron football (used for North American football). The virtual view 322 is directed towards a player currently in possession of the ball. The virtual view 322 captures the player while the ball and the camera arrangement 1600 included therein are rolling. The rotational parameters of the virtual view 322 are changed in response to a change of the position of the player detected in the virtual view.

Figure 20:
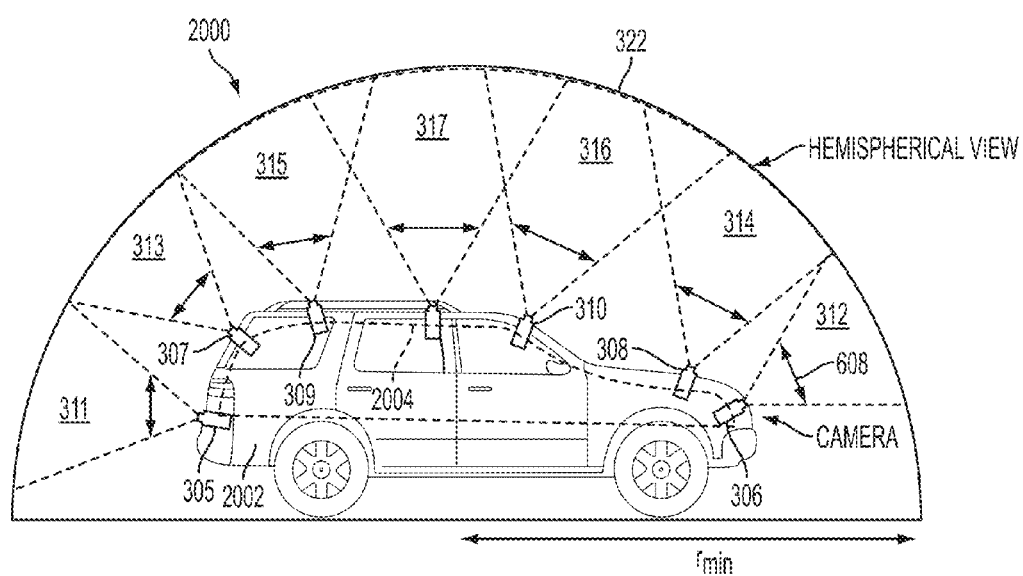
FIG. 20 schematically illustrates a non-spherical camera arrangement.

FIG. 20 schematically illustrates a cross-section of a camera arrangement 2000 for implementation in a vehicle 2002. A surface 2004 of the vehicle 2002, an areal density of the plurality of cameras 305 to 311 distributed on the surface 2004, and the opening angles 608 of the camera views define a minimum radius, $r_{min}$, so that any point outside a hemisphere 2006 is covered by overlapping camera views. Consequently, the technique allows computing a virtual view 322 in any direction in the hemisphere based on a selection of two or three camera views among the camera views 311 to 317.

The converging camera arrangement 302, the spherically symmetric camera arrangement 1600 and the surficial camera arrangement 2000 are examples of camera arrangements realizable by, or in conjunction with, embodiments of the technique. The camera arrangements 1600 and 2000 are also examples of a diverging camera arrangement. A spatial distribution of the cameras, which does not following a certain surface, can also be implemented. Each of the camera views can provide a different view, e.g., because at least one of the external parameters differs.

As has become apparent based on above exemplary embodiments, at least some embodiments achieve a linear computation for synthesizing a virtual view, which is faster and requires less hardware resources due to the linearity. The linearity further yields more accurate numerical results to the benefit of image quality.

The technique does not require an accurate coincidence of projection centers for a plurality of cameras. Even if the projection centers of the plurality of cameras do not coincide, at least some embodiments of the technique allow computing a specific virtual view having a well-defined point of view and a well-defined direction of view. Some embodiments of the technique do not require a symmetric arrangement of the projection centers or cameras, such as the camera arrangement 2000.

The device for computing the virtual view can be collocated with the one or more cameras, e.g., in a mobile device. Due to computational efficiency, the mobile device can be powered by solar cells. The computation can be parallelized, e.g., based on the linearity of the computation and/or the independence of computing pixels in different parts of a partition of the virtual view. Field-Programmable Gate Arrays (FPGAs) or Application-Specific Integrated Circuits (ASICs) connected in processing pipelines for each part of the partition allow processing the camera views in parallel.

Some embodiments can compute the virtual view based on camera views that change with time. Position and orientation of the virtual view can be time-independent in an inertial frame of reference, even if the camera views change with time.

The invention claimed is:
1. A method, performed by a device, for computing an image of a virtual view, the method comprising:
   receiving a plurality of camera views from one or more cameras;
   selecting from among the plurality of camera views two or three camera views that at least partially overlap and that at least partially overlap with the virtual view; and
   computing the image of the virtual view based on objects in the selected camera views using a multilinear relation that relates the selected camera views and the virtual view, wherein
   the multilinear relation is represented by a trifocal tensor (T), if two camera views are selected, and wherein the multilinear relation is represented by a quadrifocal tensor (Q), if three camera views are selected, wherein
   the virtual view is specified by parameters of a projection, the parameters of the projection specifying the virtual view include a zoom level of the virtual view, wherein
   a mesh is represented in memory, the mesh including a vertex for each of the camera views and an edge for each pair of overlapping camera views among the plurality of camera views, and
   the selection of the camera views from among the plurality of camera views depends on the zoom level of the virtual view and one or more other parameters of the projection specifying the virtual view.

2. The method of claim 1, wherein different parts of the image of the virtual view are computed based on different selections of two or three camera views.

3. The method of claim 2, wherein the different parts form a partition that is indicative of the two or three at least partially overlapping camera views among the plurality of camera views for each of the parts.

4. The method of claim 1, wherein parameters of a projection are specified for each of the camera views.

5. The method of claim 1, wherein the mesh indicates pairs and triples of overlapping camera views as a function of the projection parameters of the virtual view.

6. The method of claim 1, further comprising computing the multilinear relation as a function of one or more of the projection parameters of the virtual view.

7. The method of claim 6, wherein a projection matrix (P) is specified for each of the selected camera views and the virtual view, and wherein the multilinear relation is computed based on the projection matrices.

8. The method of claim 1, wherein the parameters of the projection specifying the virtual view further specify at least one of: a position of a projection center of the virtual view; an orientation of an optical axis; and/or and a projection plane of the virtual view.

9. The method of claim 1, wherein a sequence of images of the virtual view is computed based on changing projection parameters of the virtual view.

10. A computer program product comprising a non-transitory computer readable medium comprising program code for carrying out the method according to claim 1 when the computer program product is executed on one or more computing devices.

11. A device for computing an image of a virtual view based on a plurality of camera views, the device comprising:
a memory; and
a processor, wherein the processor is configured to:
receive a plurality of camera views from one or more cameras;
select from among the plurality of camera views two or three camera views that at least partially overlap and that at least partially overlap with the virtual view; and
compute the image of the virtual view based on objects in the selected camera views using a multilinear relation that relates the selected camera views and the virtual view, wherein
the multilinear relation is represented by a trifocal tensor (T), if two camera views are selected, and wherein the multilinear relation is represented by a quadrifocal tensor (Q), if three camera views are selected, wherein
the virtual view is specified by parameters of a projection, and
the parameters of the projection specifying the virtual view include a zoom level of the virtual view, wherein
a mesh is represented in memory, the mesh including a vertex for each of the camera views and an edge for each pair of overlapping camera views among the plurality of camera views, and
the selection of the camera views from among the plurality of camera views depends on the zoom level of the virtual view and one or more other parameters of the projection specifying the virtual view.

12. The device of claim 11, further comprising a receiver adapted to wirelessly receive image data from the one or more cameras in hardware.

* * * * *